US010325212B1

(12) United States Patent
Paliwal et al.

(10) Patent No.: US 10,325,212 B1
(45) Date of Patent: Jun. 18, 2019

(54) PREDICTIVE INTELLIGENT SOFTBOTS ON THE CLOUD

(71) Applicant: InsideView Technologies, Inc., San Francisco, CA (US)

(72) Inventors: Abhay Kumar Paliwal, Bhopal (IN); Vedula Vijaya Saradhi, Guwahati (IN); Jason Muldoon, San Francisco, CA (US)

(73) Assignee: Insideview Technologies, Inc., San Francisco, CA (US)

( * ) Notice: Subject to any disclaimer, the term of this patent is extended or adjusted under 35 U.S.C. 154(b) by 1029 days.

(21) Appl. No.: 14/667,592

(22) Filed: Mar. 24, 2015

(51) Int. Cl.
*G06F 17/00* (2019.01)
*G06F 17/20* (2006.01)
*G06N 5/04* (2006.01)
*G06N 20/00* (2019.01)

(52) U.S. Cl.
CPC ............... *G06N 5/04* (2013.01); *G06N 20/00* (2019.01)

(58) Field of Classification Search
CPC .......... G06N 7/005; G06N 5/02; G06N 5/022; G06N 5/048; G06N 3/02; G06N 3/0454; G06N 5/04; G06F 17/278; G06F 17/30011; G06F 17/30516; G06F 17/30598; G06F 17/30705; G06F 11/0769
See application file for complete search history.

(56) References Cited

U.S. PATENT DOCUMENTS

| | | | |
|---|---|---|---|
| 6,006,227 A * | 12/1999 | Freeman | G06F 17/30011 |
| | | | 707/695 |
| 7,496,567 B1 | 2/2009 | Steichen | |
| 7,603,330 B2 | 10/2009 | Gupta et al. | |
| 7,668,813 B2 | 2/2010 | Baeza-Yates | |
| 7,809,723 B2 | 10/2010 | Liu et al. | |
| 8,195,674 B1 | 6/2012 | Bem et al. | |
| 8,285,619 B2 | 10/2012 | Herz et al. | |
| 8,386,401 B2 | 2/2013 | Virkar et al. | |
| 8,484,015 B1 | 7/2013 | Wolfram et al. | |
| 8,494,987 B2 | 7/2013 | Katukuri et al. | |
| 8,498,986 B1 | 7/2013 | Botros | |
| 8,612,427 B2 | 12/2013 | Patterson | |

(Continued)

OTHER PUBLICATIONS

Santini, Marina, "Cloud & Big Data Day," Oct. 3, 2013, 9 pages.

(Continued)

*Primary Examiner* — Luis A Sitiriche
(74) *Attorney, Agent, or Firm* — Patent Law Works LLP

(57) ABSTRACT

A system and method for generating a prediction are disclosed. In one embodiment, the method includes receiving a plurality of time-based documents; receiving a user query including a time period of interest defining a subset of the time-based documents from which to generate a prediction; and a plurality of cloud-based software agents classifying the subset of the plurality of time-based documents into a plurality of classes for the plurality entities, wherein the plurality of cloud-based software agents intercommunicate using distributed processing, wherein each of the plurality of cloud-based software agents is dedicated to one of the entities in the plurality of entities; and generating, using at least one machine learning method, the prediction based on the subset of the plurality of time-based documents for at least one of a plurality of categories. However, other embodiments are disclosed.

69 Claims, 19 Drawing Sheets

(56) References Cited

U.S. PATENT DOCUMENTS

| | | | |
|---|---|---|---|
| 8,620,852 | B1 | 12/2013 | Kipersztok et al. |
| 8,639,719 | B2 | 1/2014 | Fisher et al. |
| 8,645,991 | B2 | 2/2014 | McIntire et al. |
| 8,713,023 | B1 | 4/2014 | Cormack et al. |
| 8,775,400 | B2 | 7/2014 | Ickman et al. |
| 2002/0002548 | A1 | 1/2002 | Roundtree |
| 2006/0277165 | A1* | 12/2006 | Yoshimura ........ G06F 17/30654 707/999.003 |
| 2007/0016609 | A1 | 1/2007 | Kim et al. |
| 2007/0198459 | A1 | 8/2007 | Boone et al. |
| 2008/0312985 | A1 | 12/2008 | Williams |
| 2009/0024504 | A1 | 1/2009 | Lerman et al. |
| 2009/0222395 | A1 | 9/2009 | Light et al. |
| 2011/0225135 | A1* | 9/2011 | Konchitsky ....... G06F 17/30696 707/706 |
| 2012/0197934 | A1 | 8/2012 | Zhang et al. |
| 2013/0138577 | A1 | 5/2013 | Sisk |
| 2013/0185232 | A1 | 7/2013 | Hochstein |
| 2013/0204896 | A1 | 8/2013 | Peris et al. |
| 2013/0290232 | A1 | 10/2013 | Tsytsarau et al. |
| 2013/0297590 | A1 | 11/2013 | Zukoysky et al. |
| 2013/0346899 | A1 | 12/2013 | Cole et al. |
| 2014/0006012 | A1 | 1/2014 | Zhou et al. |
| 2014/0074850 | A1 | 3/2014 | Noel et al. |
| 2014/0095425 | A1 | 4/2014 | Sipple |
| 2015/0106308 | A1* | 4/2015 | Harrison ................ G06N 3/126 706/12 |
| 2015/0293904 | A1* | 10/2015 | Roberts ............. G06F 17/30976 704/9 |
| 2015/0371143 | A1 | 12/2015 | Sponaugle |

OTHER PUBLICATIONS

Yerva, Surender et al., "Cloud based Social and Sensor Data Fusion," 2012 15th International Conference on Information Fusion, Jul. 9-12, 2012, 8 pages.

"Google Flu Trends," Wikipedia article, <https://en.wikipedia.org/wiki/Google_Flu_Trends>, retrieved on Jun. 22, 2015, 4 pages.

Amodeo, Giuseppe et al., "Hybrid Models for Future Event Prediction," CIKM'11, Oct. 24-28, 2011, 4 pages, Glasgow, Scotland.

Federgruen, Awi et al,, "Optimal Flows in Networks with Multiple Sources and Sinks, With Applications to Oil and Gas Lease Investment Programs," Operations Research, Mar.-Apr. 1986, pp. 218-225, vol. 34, No. 2.

Google Cloud Platform, Prediction API, <https://cloud.google.com/prediction/>, retrieved on Jun. 22, 2015, 5 pages.

Bothos, E. et al., "Using Social Media to Predict Future Events with Agent-Based Markets," IEEE Intelligent Systems (2010) pp. 50-58.

Logiurato, B., "Nate Silver: Obama's Odd's of Winning the Election are Higher Than Ever" Business Insider (Sep. 27, 2012) downloaded from Internet Archive <https://web.archive.org/web/20121031110313/http://www.businessinsider.com/nate-silver-obama-odds-romney-win-election-prediction-five-thirty-eight-2012-9> 1 pg.

Radinsky, K. et al., "Mining the Web to Predict Future Events," ACM Web Search and Data Mining (WSDM) Conference (Feb. 2012) 10 pp.

Ter Braak, C.j.f., "Canonical Correspondence Analysis: A New Eigenvector Technique for Multivariate Direct Gradient Analysis," Ecology, vol. 67, No. 5 (1986) pp. 1167-1179.

Wolfers, J. et al., "Interpreting prediction market prices as probabilities," IZA Discussion Papers, No. 2092 (2006) pp.

Xiang G. et al., "A Supervised Approach to Predict Company Acquisition With Factual and Topic Features Using Profiles and News Articles on TechCrunch," 6th Intl. AAAI Conf. on Weblogs and Social Media (ICWSM 2012) 8pp.

Faridani, S., Using canonical correlation analysis for generalized sentiment analysis, product recommendation, and search, Proc. of the 5th ACM Conf. on Recommender Systems (2011) pp. 355-358. (Year: 2011).

* cited by examiner

FIG 1

Welcome Abhay: News Alert on Tesla Motors.

100

InsideView TEAM | Search for company, person, or news

| Home | Watchlists ▼ | Build a List |

Tesla Motors, Inc. | Private Company □ Export ✓ Following ▼

| Overview | People | Buzz | Family Tree | Competitors | More ▼ |

Industry: Automobile Manufacturing | View Profile
Revenue: $20.0M
Employees: 2,700
Description: Tesla Motors, Inc. engages in the design, manufacture, and sale of electric vehicles and ... | more 1050 Bing Street
San Carlos, CA 94070
United States
www.teslamotors.com | More
Phone: 1-650-413-4000

Smart Agent Results     7 Days ▽

2 New Offerings
3 Acquisitions
1 Partnerships
1 Outperforming
7 Litigation
4 Fund Developm...
1 Bankruptcy & Res...
2 Corporate Challe...

U.S. Auto Dealer Group Seeks Tesla Meeting After Lawsuits
Washington... - Oct 24, 08:17 ... | Share ▽
AutoDealer Group Leaving Tesla Retail Challenge to States
San Fran... - Oct 23, 11:34 ... [1 more]
Share ▽

News Categories — 101

102 Predictive Future Event based on last 30 days

⊗ Connection     View all

You connect to 9 people
Larry Sonsini — Board Member
Steven P. Westly — Board Member
Search for connections on LinkedIn 💬 Buzz     All buzz

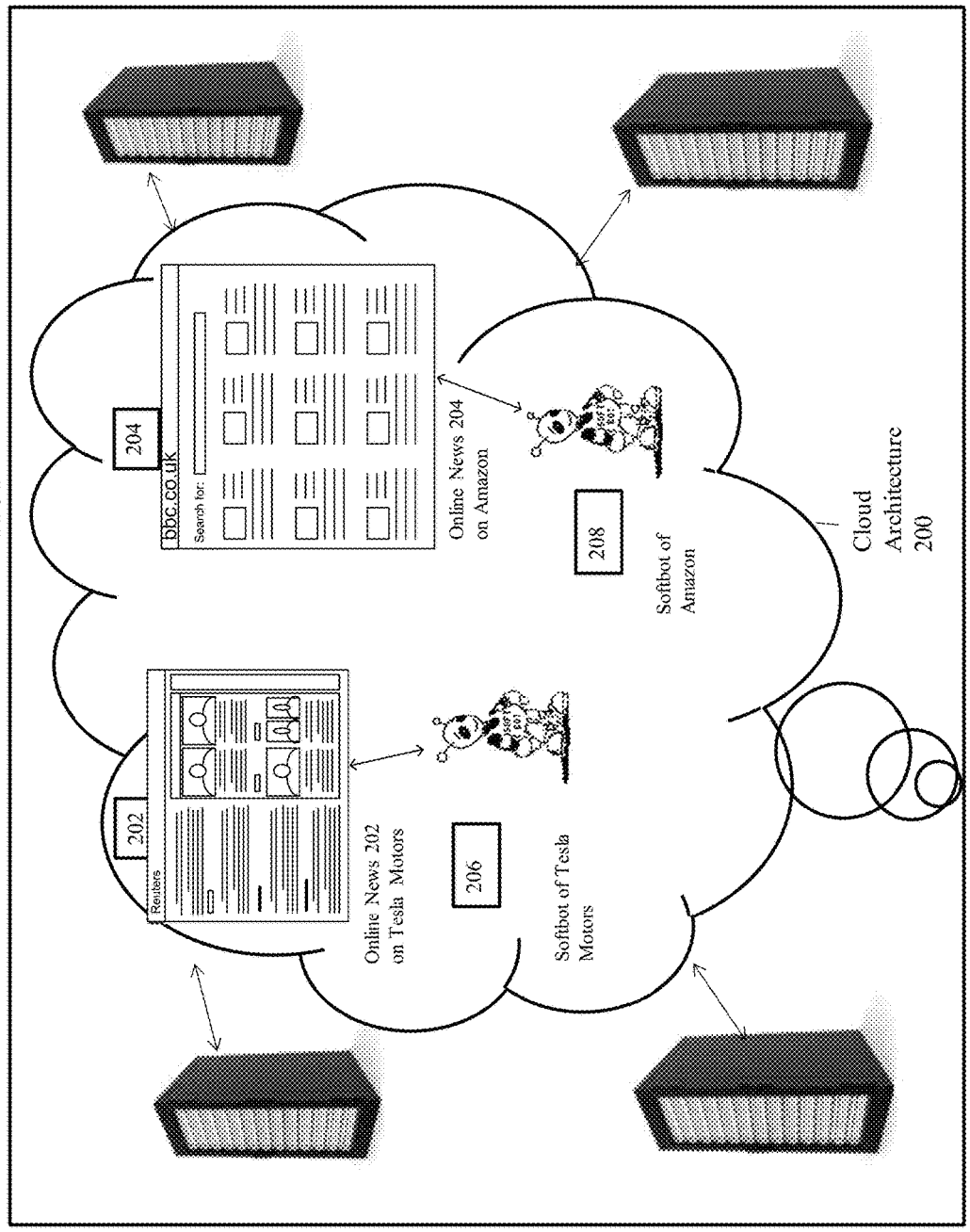

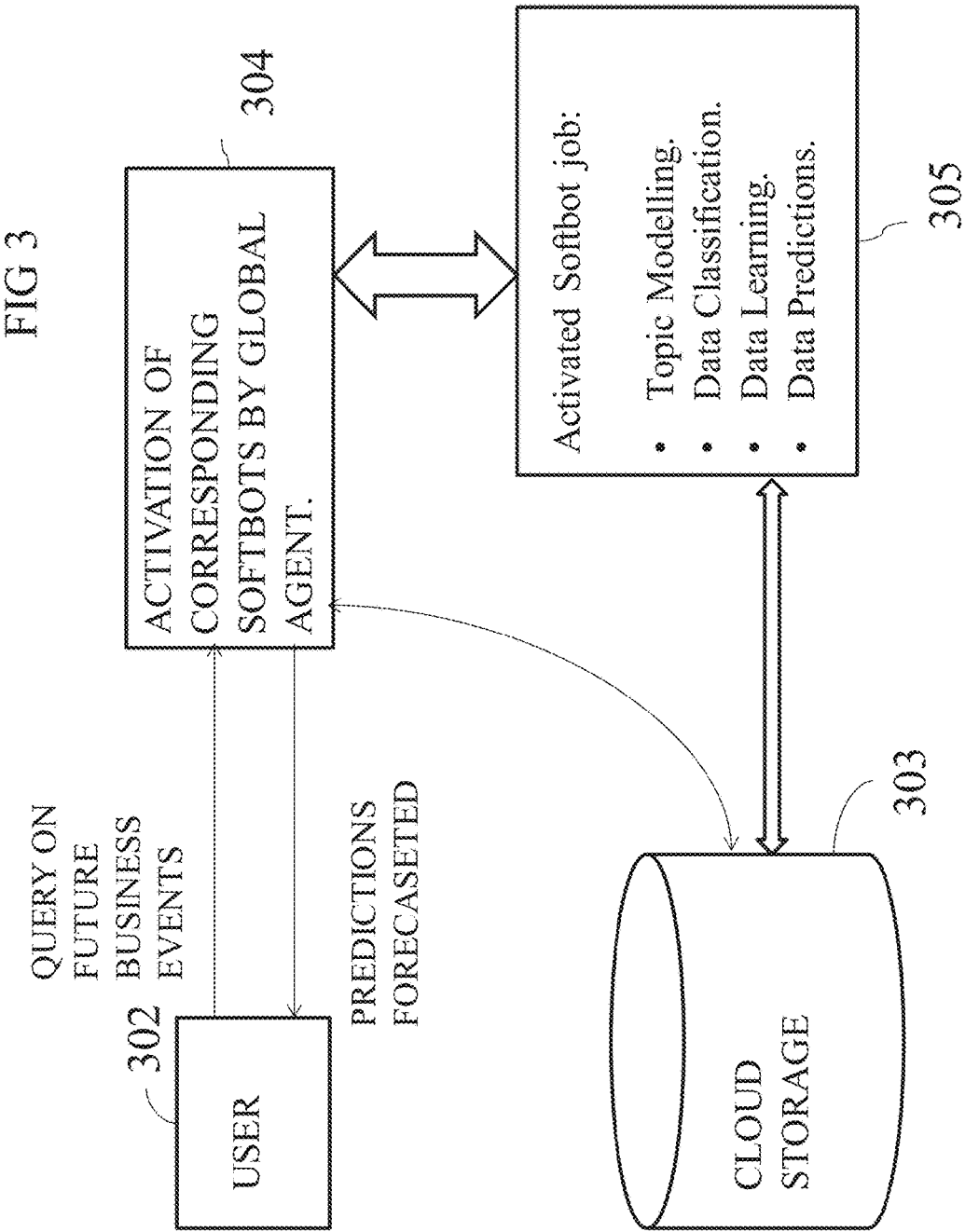

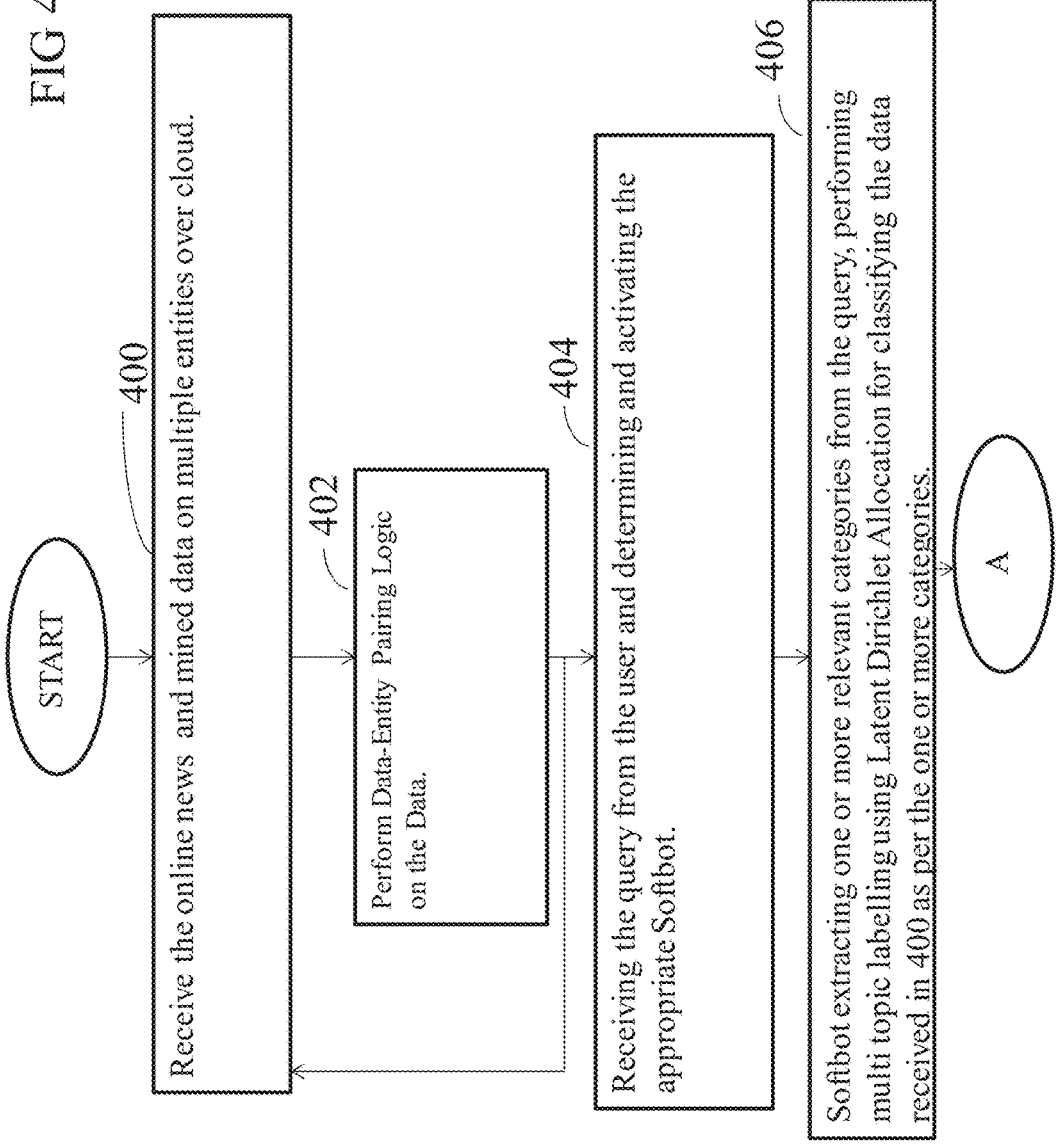

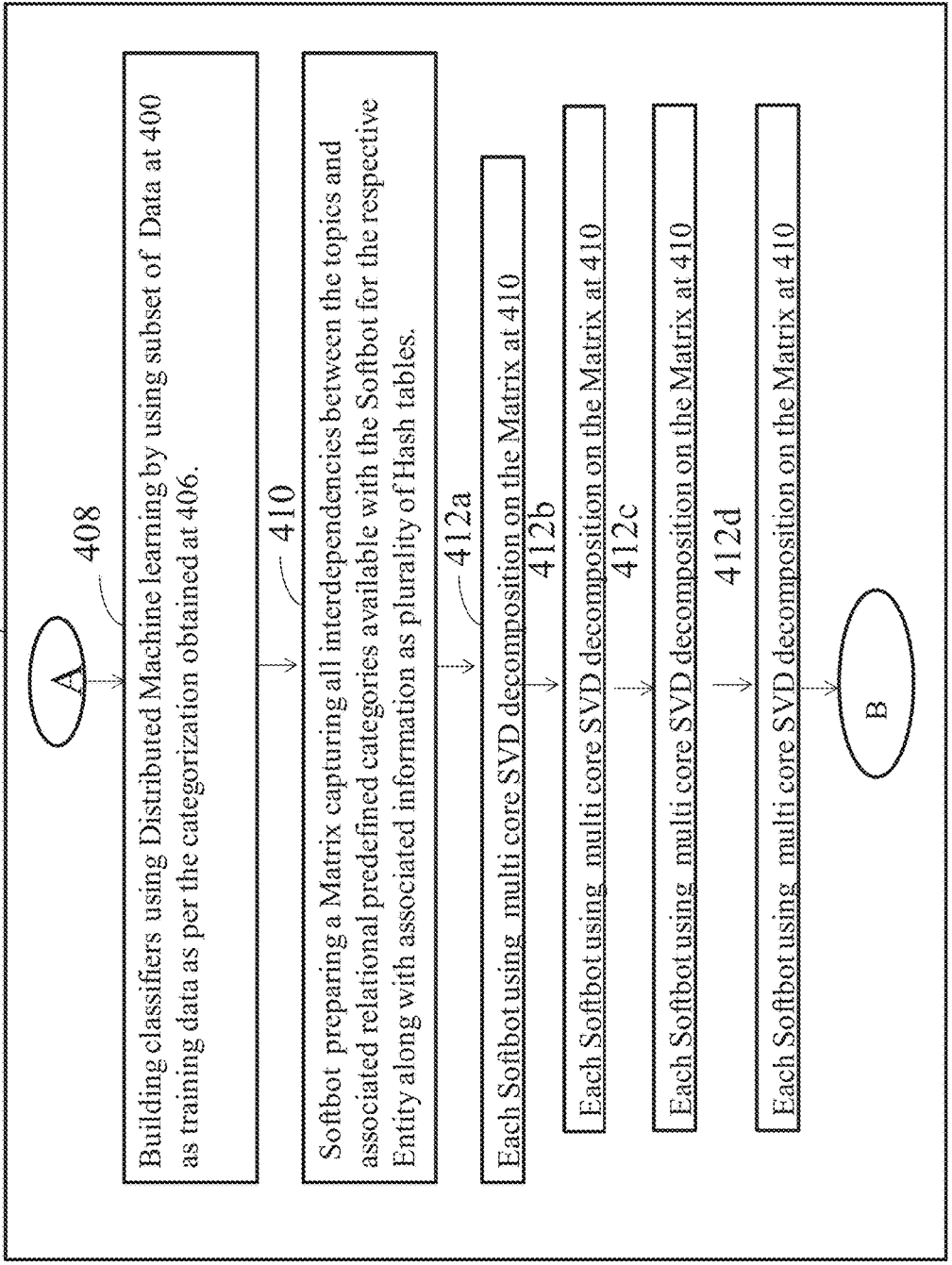

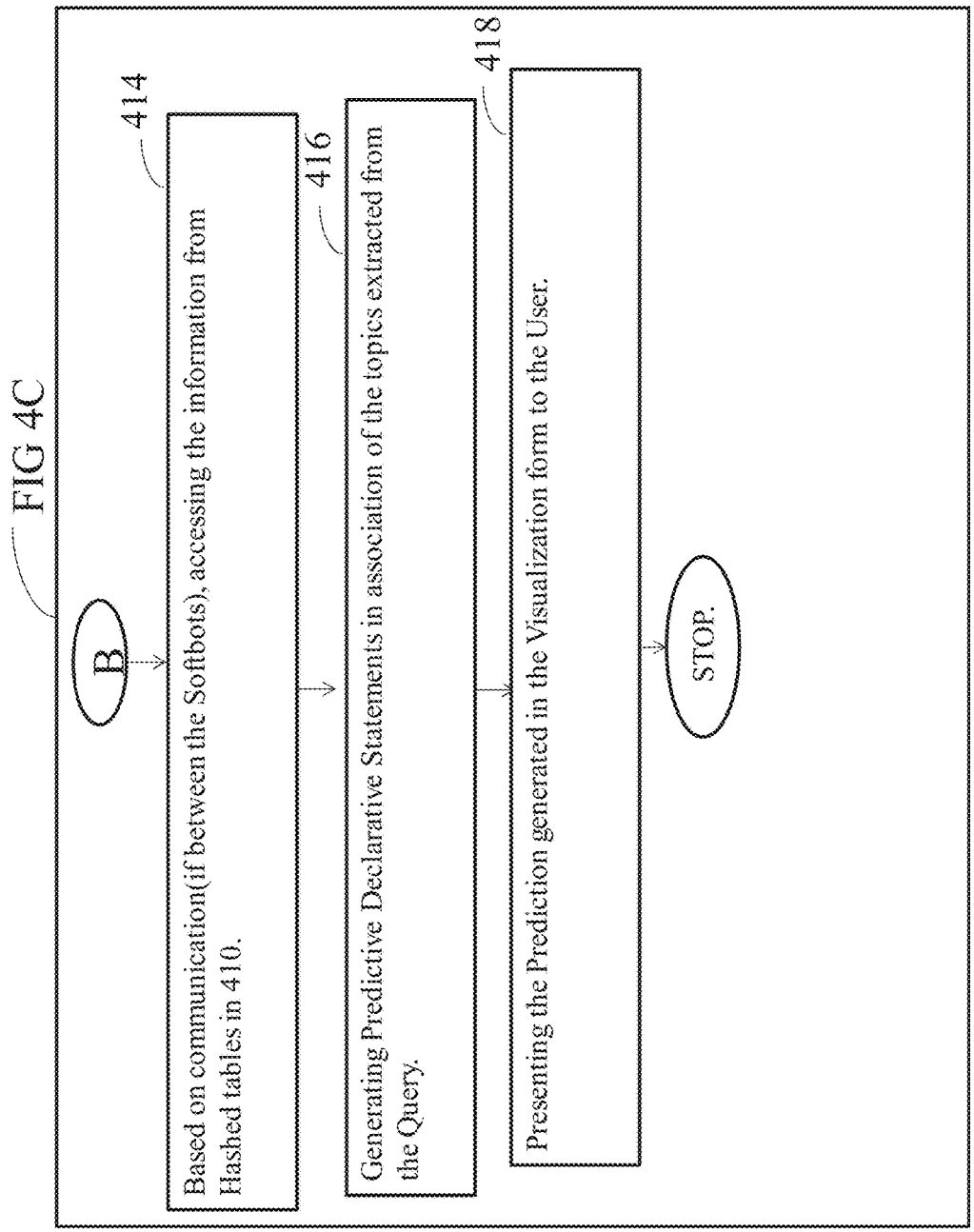

FIG 5B

Past 30 days News on Microsoft:

Microsoft is in negotiation with Yahoo as Yahoo is a possible next big acquisition of Microsoft of this year.

Yahoo is not comfortable with the negotiation deal offered by the Microsoft.

Bill Gates is looking not much optimistic about the way Steve Ballmer is going with Jerry Yang on the acquisition deal Microsoft is venturing heavily in Cloud under the leadership of Satya Nadella.

Microsoft is planning to purchase IP property of Nokia in some time.

Vectors extracted

→ <Microsoft negotiation Yahoo>
<Yahoo next acquisition Microsoft>

→ <Yahoo not negotiation Microsoft>
<Yahoo not negotiation Microsoft>

→ <Bill Gates not optimistic Steve Ballmer>
<Steve Ballmer acquisition Jerry Yang>

→ <Microsoft leadership Satya Nadella>
<Microsoft venturing Cloud>

→ <Microsoft IP Nokia >

FIG 5C

| | C-C | | | | C-E | | | | E-E | | | | E-Po | | | | | |
|---|---|---|---|---|---|---|---|---|---|---|---|---|---|---|---|---|---|---|
| | $e_{11}$ | $e_{12}$ | ... | | $e_{1n}$ | $e_{11}$ | $e_{12}$ | ... | $e_{1n}$ | $e_{11}$ | $e_{12}$ | ... | $e_{1n}$ | $e_{11}$ | $e_{12}$ | ... | $e_{1n}$ | Class |
| | $e_{21}$ | $e_{22}$ | ... | | $e_{2n}$ | $e_{21}$ | $e_{22}$ | ... | $e_{2n}$ | $e_{21}$ | $e_{22}$ | ... | $e_{2n}$ | $e_{21}$ | $e_{22}$ | ... | $e_{2n}$ | Merge Move |
| | $e_{D1}$ | $e_{D2}$ | ... | | $e_{Dn}$ | $e_{D1}$ | $e_{D2}$ | ... | $e_{Dn}$ | $e_{D1}$ | $e_{D2}$ | ... | $e_{Dn}$ | $e_{D1}$ | $e_{D2}$ | ... | $e_{Dn}$ | Outsource |

Microsoft Matrix representation used for Classification

| | C-C | | | | C-E | | | | E-E | | | | E-Po | | | | | |
|---|---|---|---|---|---|---|---|---|---|---|---|---|---|---|---|---|---|---|
| | $e_{11}$ | $e_{12}$ | ... | | $e_{1n}$ | $e_{11}$ | $e_{12}$ | ... | $e_{1n}$ | $e_{11}$ | $e_{12}$ | ... | $e_{1n}$ | $e_{11}$ | $e_{12}$ | ... | $e_{1n}$ | Class |
| | $e_{21}$ | $e_{22}$ | ... | | $e_{2n}$ | $e_{21}$ | $e_{22}$ | ... | $e_{2n}$ | $e_{21}$ | $e_{22}$ | ... | $e_{2n}$ | $e_{21}$ | $e_{22}$ | ... | $e_{2n}$ | Merge Move |
| | $e_{D1}$ | $e_{D2}$ | ... | | $e_{Dn}$ | $e_{D1}$ | $e_{D2}$ | ... | $e_{Dn}$ | $e_{D1}$ | $e_{D2}$ | ... | $e_{Dn}$ | $e_{D1}$ | $e_{D2}$ | ... | $e_{Dn}$ | Outsource |

Yahoo Matrix representation used for Classification

| | C-C | | | | C-E | | | | E-E | | | | E-Po | | | | | |
|---|---|---|---|---|---|---|---|---|---|---|---|---|---|---|---|---|---|---|
| | $e_{11}$ | $e_{12}$ | ... | | $e_{1n}$ | $e_{11}$ | $e_{12}$ | ... | $e_{1n}$ | $e_{11}$ | $e_{12}$ | ... | $e_{1n}$ | $e_{11}$ | $e_{12}$ | ... | $e_{1n}$ | Class |
| | $e_{21}$ | $e_{22}$ | ... | | $e_{2n}$ | $e_{21}$ | $e_{22}$ | ... | $e_{2n}$ | $e_{21}$ | $e_{22}$ | ... | $e_{2n}$ | $e_{21}$ | $e_{22}$ | ... | $e_{2n}$ | Merge Move |
| | $e_{D1}$ | $e_{D2}$ | ... | | $e_{Dn}$ | $e_{D1}$ | $e_{D2}$ | ... | $e_{Dn}$ | $e_{D1}$ | $e_{D2}$ | ... | $e_{Dn}$ | $e_{D1}$ | $e_{D2}$ | ... | $e_{Dn}$ | Outsource |

Oracle Matrix representation used for Classification

| | C-C | | | | C-E | | | | E-E | | | | E-Po | | | | | |
|---|---|---|---|---|---|---|---|---|---|---|---|---|---|---|---|---|---|---|
| | $e_{11}$ | $e_{12}$ | ... | | $e_{1n}$ | $e_{11}$ | $e_{12}$ | ... | $e_{1n}$ | $e_{11}$ | $e_{12}$ | ... | $e_{1n}$ | $e_{11}$ | $e_{12}$ | ... | $e_{1n}$ | Class |
| | $e_{21}$ | $e_{22}$ | ... | | $e_{2n}$ | $e_{21}$ | $e_{22}$ | ... | $e_{2n}$ | $e_{21}$ | $e_{22}$ | ... | $e_{2n}$ | $e_{21}$ | $e_{22}$ | ... | $e_{2n}$ | Merge Move |
| | $e_{D1}$ | $e_{D2}$ | ... | | $e_{Dn}$ | $e_{D1}$ | $e_{D2}$ | ... | $e_{Dn}$ | $e_{D1}$ | $e_{D2}$ | ... | $e_{Dn}$ | $e_{D1}$ | $e_{D2}$ | ... | $e_{Dn}$ | Outsource |

Nokia Matrix representation used for Classification

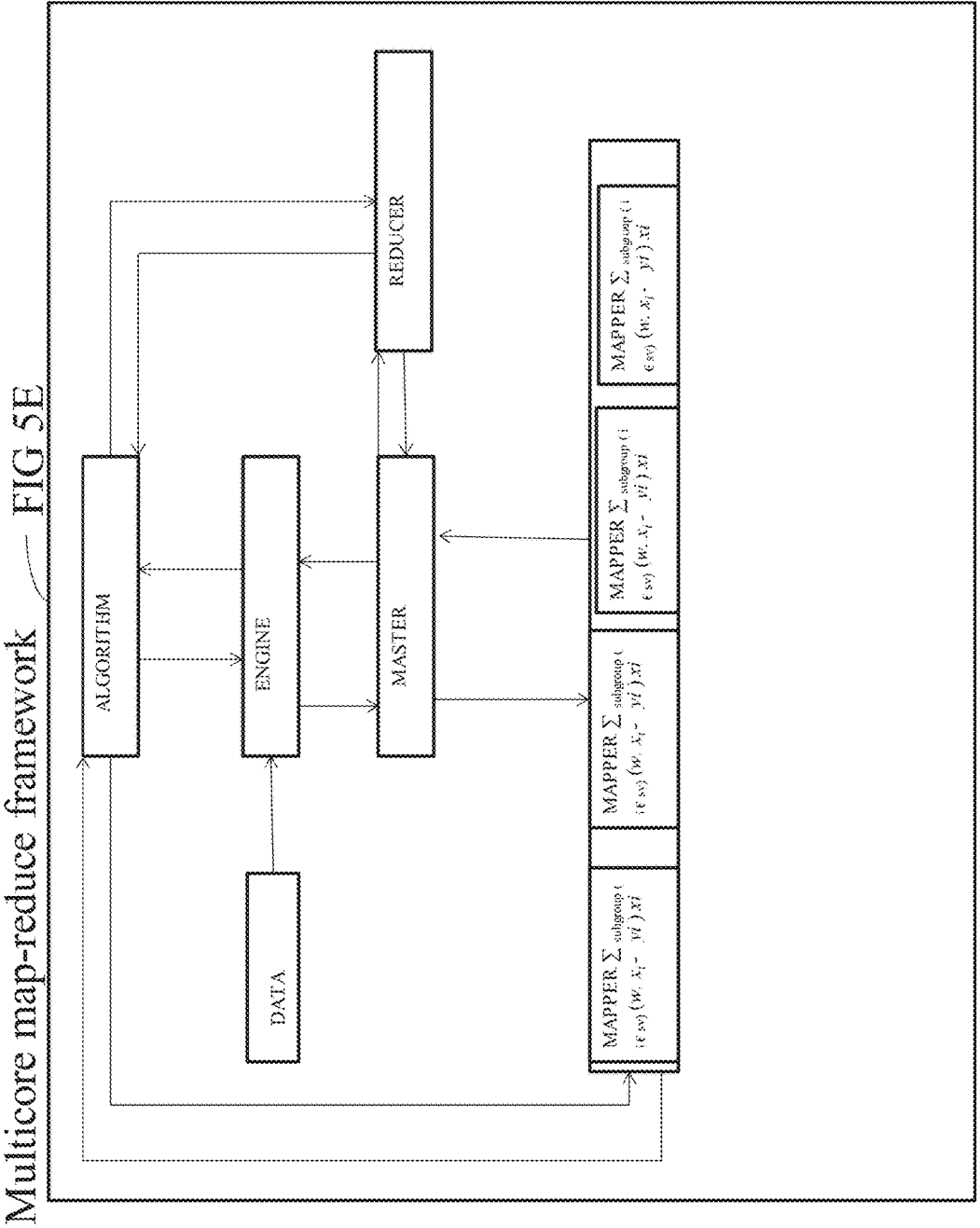

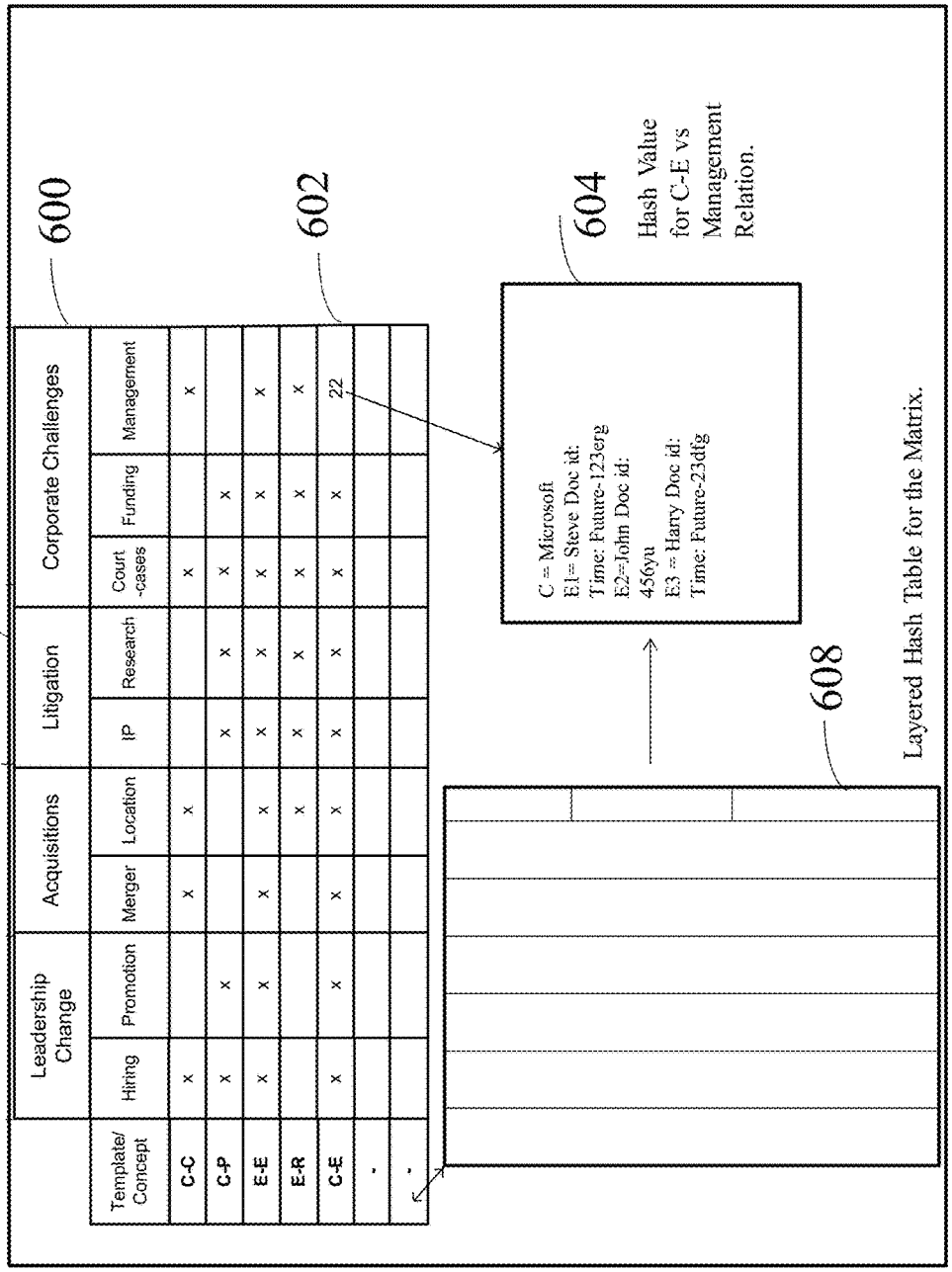

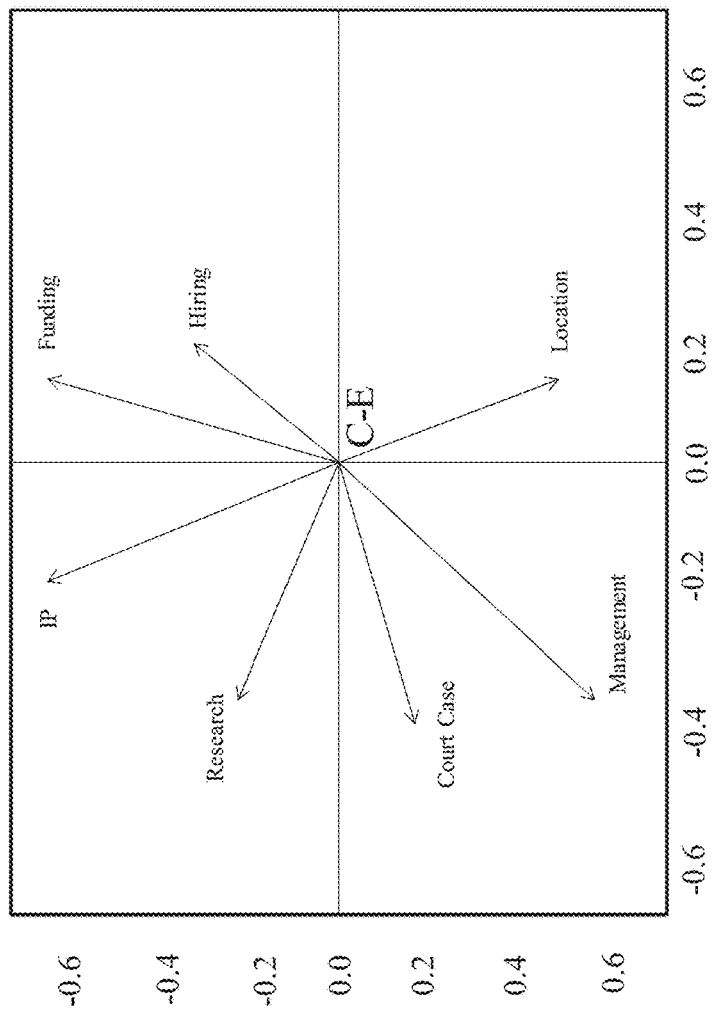

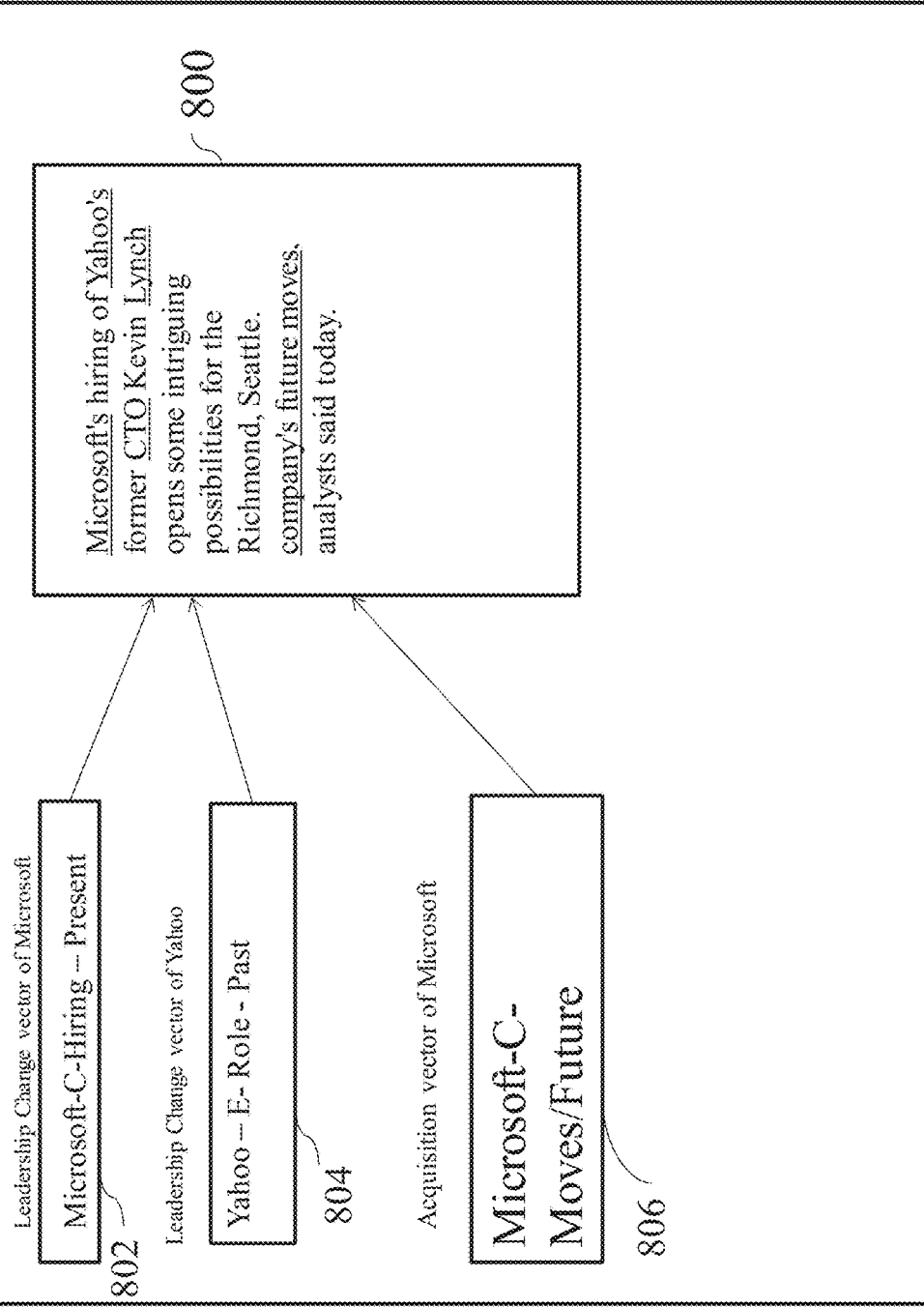

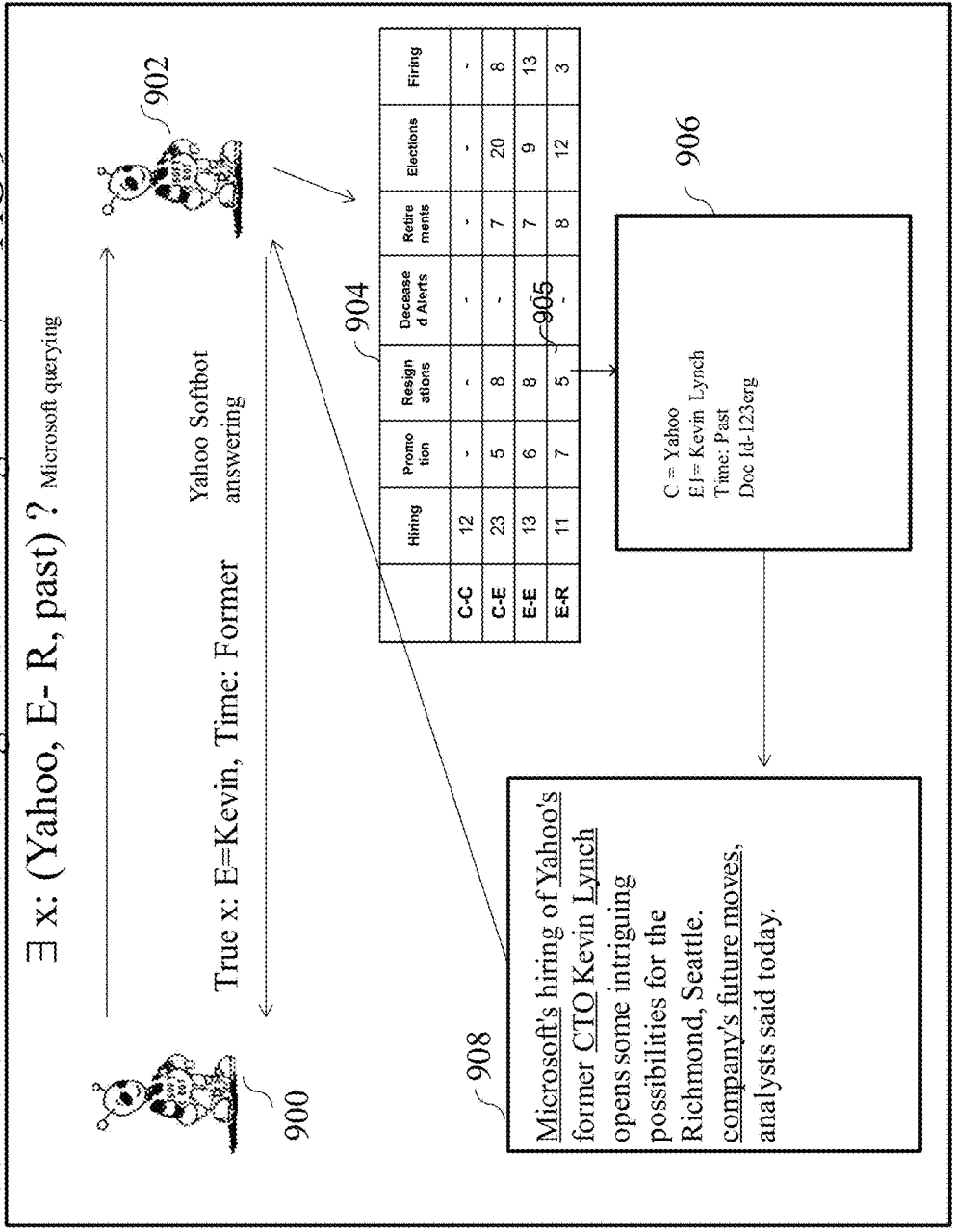

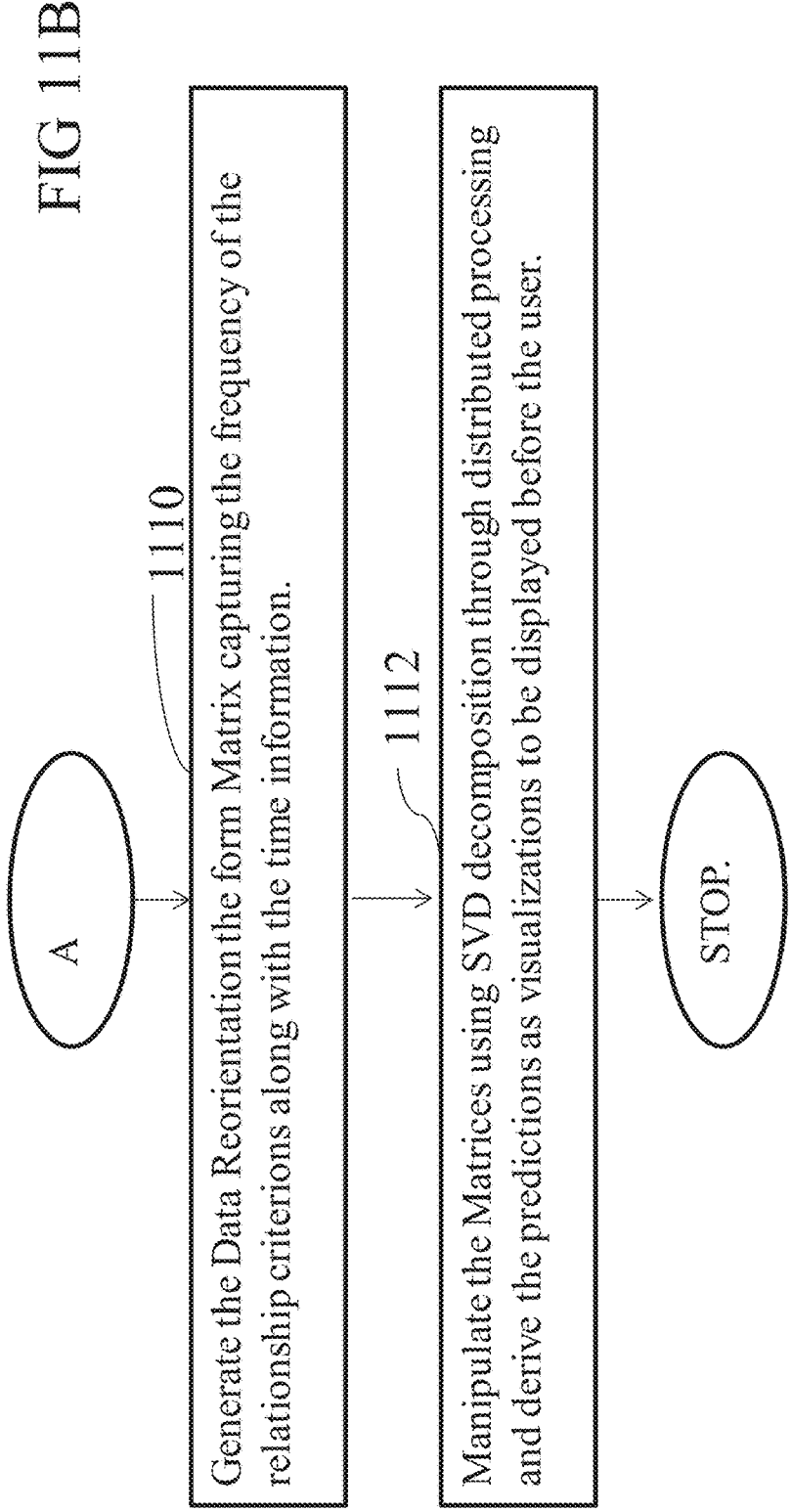

PREDICTIVE INTELLIGENT SOFTBOTS ON THE CLOUD

FIELD OF THE INVENTION

The present disclosure relates to digital data processing. More particularly, the present disclosure relates to digital data processing for generating predictions of future events and graphically presenting these predictions to a user.

BACKGROUND

A first deficiency of existing solutions for making predictions is that existing solutions lack a comprehensive framework for considering the impact of a whole set of entities, which may influence each other, when making a prediction. Taking into account these inter-entity influences before making the prediction is lacking from existing solutions and especially desirable in the era of Social Networking where world events are becoming more and more interdependent and prediction as an isolated exercise seems to no longer be relevant. The absence of such functionality becomes more alarming when considering the volume of big data that is continuously generated on the set of entities of any domain particularly Politics, Sports, Business, Religions and other such big institutions. Consider the case where oneself, as a user of the Internet, receives general predictions on the possible business events such as: "Microsoft may acquire Yahoo", and a separate prediction as, "Yahoo's CEO may step down". What is missing in these two isolated business predictions are that they are influencing each other and any serious user will be more interested in getting the cumulative prediction as: Microsoft may not acquire Yahoo as Yahoo CEO may not step down. Developing such predictions of a future event based on and involving more than one entity is not present in existing solutions. Such multi-entity based predictions may be beneficial and desirable as information in the form of news and other documents often talk about more than one entity in different contexts. Making predictions by capturing interdependency contexts involving different entities, as in the above example of news involving Microsoft and Yahoo, is highly desirable but lacking from existing solutions.

A second deficiency of existing solutions for generating predictions is that existing solutions fail to present the predictions in a manner that optimizes the usefulness of the predictions. For example existing systems fail to present predictions along with declarative statements to the user as some sort of real time charts or graphs which allows a user to understand why a particular prediction has been generated and what other factors are influencing the derived predictions. Presently, user experience is on equal footing with the sophisticated computation, the deficiencies in the presentation of predictions should be addressed.

A third deficiency of existing systems is the absence of distributed processing. Existing systems fail to handle large volumes of data over the cloud regarding many (potentially millions) of entities for which a prediction may be made. If a prediction based on such potentially large volumes of data is to be made, that data may be "learned" by Machine Learning Algorithms. However, present solutions fail to provide a well co-ordinated, distributed Machine Learning Algorithms running on multi core to speed up the system and also fail to generate the real time predictions.

A fourth deficiency of existing solutions is the absence of user choice and the flexibly to alter time as per the demands (as world is becoming very dynamic) and the ability to make predictions based on a plurality of time choices. For example, present systems fail to give the user a choice of altering time scale such that new predictions can be generated based on last one month data and/or if required based on last 7 days data.

Accordingly, the existing solutions fail to provide an efficient robust framework employing distributed Machine Learning techniques thereby learning new data quickly and making reasonable predictions. The present disclosure corrects one or more of the above deficiencies of existing solutions for generating predictions.

SUMMARY OF THE INVENTION

According to one aspect of the invention there is provided a computer implemented method and system executed by one or more computing devices for predicting at least one future event based on a plurality of online time-based documents on a cloud computing architecture. The method comprises the steps of: receiving, using one or more processors, a plurality of time-based documents; receiving, by a Software as a Service Cloud based server, a user query including a time period of interest defining a subset of the time-based documents from which to generate a prediction; determining to activate a plurality of cloud-based software agents based on a plurality of entities associated with the query; classifying, by executing the plurality of cloud-based software agents, the subset of the plurality of time-based documents into a plurality of classes for the plurality entities, wherein the plurality of cloud-based software agents intercommunicate using distributed processing, wherein each of the plurality of cloud-based software agents is dedicated to one of the entities in the plurality of entities; and generating, by executing the plurality of cloud-based software agents, using at least one machine learning method, the prediction based on the subset of the plurality of time-based documents for at least one of a plurality of categories.

According to another aspect of the invention there is provided a computer implemented method and system executed by one or more computing devices on a cloud computing architecture for predicting an answer to a query on a plurality of documents. The method comprises the steps of: receiving, using one or more processors, a time-based query from the user; determining a classification criterion, a relationship criterion and a time period of interest from the time-based query; obtaining at least one second influential classification criterion, at least one second influential relationship criterion, a plurality of influential concepts and a plurality of influential entities from a knowledge base; classifying a plurality of documents based on the classification criterion, at least one of the second influential classification criterion, and the time-based query using a distributed machine learning method; extracting a plurality of influential entities for the at least one relationship criterion, the at least one second influential relationship criterion from a plurality of classified documents based on the at least one classification criterion, the at least one second influential classification criterion and the time-based query using a distributed processing; generating a plurality of data representations between the relationship criterion and said plurality of influential entities based on said at least one classification criterion and the time-based query using the classified documents; and applying a distributed processing method to manipulate said plurality of data representations for generating a visualization of a prediction responsive to the time-based query wherein the prediction captures a combined influence existing between the classification criterion, the at least one second influential criterion, the relationship criterion and the at least one second influential relationship criterion.

It should be understood that the above is not all-inclusive and many additional steps, features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

FIG. 1 is an example user interface for cloud-based prediction using documents according to one embodiment.

FIG. 2 illustrates an example diagram of cloud-based Softbots responsible for generating predictions for their respective entities according to one embodiment.

FIG. 3 illustrates an example block diagram representation of the logic of cloud-based document prediction according to one embodiment.

FIGS. 4A-C is an example method for generating a prediction of a future event according to one embodiment.

FIGS. 5A-E include example representations of the classification of classes on which prediction will be made by employing distributed Machine Learning methods according to one embodiment.

FIG. 6 is an example of a correspondence analysis matrix representation according to one embodiment.

FIG. 7 is an example bi-plot generated by the correspondence analysis matrix used for making predictions according to one embodiment.

FIG. 8 is an example sketch of how a Softbot generates a prediction about a set of categories according to one embodiment.

FIG. 9 is an example illustration representing two Softbots intercommunicating using First Order Predicate Logic according to one embodiment.

FIG. 11A-B is a general flow chart according to one embodiment.

DETAILED DESCRIPTION

Figure 5A:
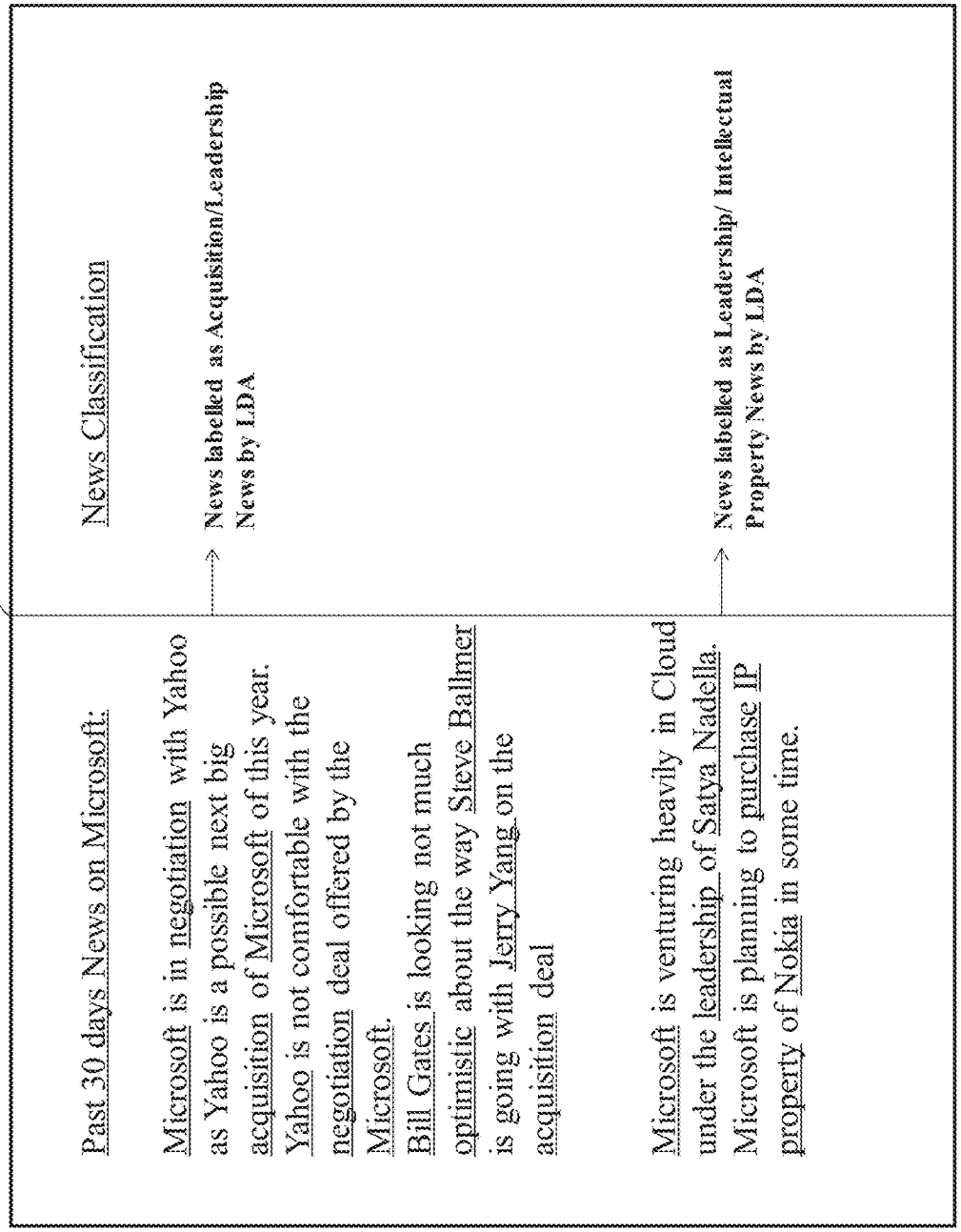

The innovation is now described with reference to the drawings, wherein like reference numerals are used to refer to similar elements throughout. In the following description, for purposes of explanation, numerous specific details are set forth in order to provide a thorough understanding thereof. It should be evident however that innovation can be practiced without these specific details. Structures and devices are shown in block diagram form in order to facilitate a description thereof.

The present invention relates to a method and system for building cloud-based Softbots. The system includes a plurality of Softbots. In one embodiment, a Softbot is dedicated to a single entity. Examples of an entity include, but are not limited to, a business, an organization, a community, a group of individuals, an individual (e.g. executive, board member, etc.), etc. The Softbot processes documents and makes predictions related/relevant to the entity associated with the Softbot. For example, assume a Softbot is associated with an entity such as Microsoft; in one embodiment, the Softbot receives documents (e.g. news) as a stream over a network, processes the documents and generates one or more predictions regarding Microsoft.

In one embodiment, the Softbot receives documents over a network. For example, a Softbot receives documents over the Internet. In one embodiment, the Softbot receives documents as a continuous stream. For example, the Softbot receives a continuous stream of news and other documents over the Internet from servers associated with news outlets or other sources. In one embodiment, the Softbot parses and classifies received documents in real-time.

A Softbot processes documents. In one embodiment, a Softbot processes documents by receiving documents, parsing documents and classifying documents into one or more classes using distributed Machine Learning, builds an efficient computational representation and, using distributed Machine Learning algorithms, makes reasonable predictions on events relevant to categories about the entity the Softbot is responsible for/associated with. In one embodiment, multiple Softbots coordinate and communicate to generate predictions regarding the entities associated with those multiple Softbots. By no means do these cloud-based Softbots guarantee the successful occurrence of the predicted events in the future real-world, since documents (e.g. news) can be noisy or rumour-based when shared by a news vendor or fetched by mining the World Wide Web (WWW). Nevertheless, Softbots make reasonable predictions on important events with a certain computational threshold.

A user (e.g. a typical sales representative) can utilize the cloud-based prediction utility described herein to query for and obtain predictions from one or more Softbots for categories of events (e.g. business events) for entities of interest to the user. In one embodiment, the user accesses such functionality through a user interface. For example, the user interface of a SaaS-based application (that utilizes the Softbots) similar to that shown in FIG. 1, which is provided by InsideView. The categories of events, occasionally referred to herein as "categories," may vary based on factors such as the type of entity as well as other factors, but, in one embodiment, categories of events relevant to a business entity may include categories such as New Offerings, Partnerships, Outperforming, Litigation, Funding Developments, Bankruptcy, Corporate Challenges, Leadership Change, Acquisitions and Mergers, IP portfolio, etc.

FIG. 1 is an example user interface for cloud-based prediction using documents according to one embodiment. In the illustrated embodiment, a cloud-based application provides an interface 100 displaying news predictions 102 for the Tesla Motors to a user as shown. Portion 101 of FIG. 1 displays business categories for which possible predictions of business events is done relevant to Tesla Motors. It should be recognized that Tesla Motors is used merely as an example of one of the many entities about which the cloud-based application is receiving online news, mining relevant documents as blogs written by authors, fetching Social Media information or a combination thereof.

Portion 102 of FIG. 1 displays an example prediction based on the last 7 days. This means that only the last 7 days of news, obtained as time-based documents, has been processed by the Softbot responsible for processing news and relevant documents for Tesla Motors and making corresponding predictions.

FIG. 2 is a cloud-based representation of the prediction utility in terms of online news for respective entities (e.g. business organizations) and their respective Softbots. FIG. 2 is an example of a cloud-based architecture where the cloud-based application, which includes the Softbots) receives a stream of online news as in 202 and 204 for Tesla Motors and Amazon, respectively, as examples. There are respective dedicated Softbot for each of entity. For example, a Softbot for Tesla Motors and a Softbot for Amazon as shown by 206 and 208 respectively.

In one embodiment, a Softbot is a cloud-based software agent. For example, the Softbots 206 and 208 may include one or more of an intelligent software agent, an automated software agent, an intelligent, automated software agent and a combination thereof. In one embodiment, an intelligent automated software agent processes, supervises and derives inferences from the data independent of external manual assistance. In one embodiment, cloud-based software agents are virtual software units executing on a plurality of remote computational devices (e.g. at geographically disparate locations across the world geography).

Softbots 206 and 208 are responsible for processing the online news of the entity to which they are dedicated/associated as 206 does for Tesla Motors and 208 does for Amazon in the illustrated embodiment. In one embodiment, the Softbots, based on a series of steps such as data extractions, data representations, data dimension reductions and followed by Machine Learning statistical logic agents, generate relevant predictions on respective categories (e.g. the predictions regarding respective business categories shown in 101 and 102 of FIG. 1).

FIG. 3 is a block diagram representation of the logic of cloud-based document prediction according to one embodiment. User 302 sends a query to a cloud-based server (e.g. a SaaS server) on a cloud architecture as in FIG. 2. In one embodiment, the query includes an entity of interest to the user 302 and for which the user 302 would like to receive a prediction based on a time period of interest. In one embodiment, the time period of interest may be predefined (e.g. by a default) and/or user specified. In one embodiment, more than one time period of interest may be defined. For example, in one embodiment, the user may be interested in receiving predictions based on last quarter, last X months and last Y days. On receiving the query and the time period of interest (e.g. by subtracting the time period from the current date to arrive at the past date), the cloud-based application, through global agent, activates the Softbots, which are cloud based, dedicated to particular organizations associated with the query at block 304 which are cloud-based. Once activated, at block 305, the activated Softbots each process news and/or other documents of its particular organization, which may be stored in cloud storage 303 according to some embodiments. In some embodiments, the Softbots' processing may include one or more of document processing, data extraction, data classification, data learning and data predictions that are shared with global agent 304, which in turn presents the predictions to the User 302. The predictions may be based on the news documents processed by the Softbots from the current date to the past date determined by the time period shared by the user. For example, in portion 102 of FIG. 1, user is shown predictions based on processing News Data of the last 7 days only.

In one embodiment, time-based news events are documents obtained from the news (e.g. received from a professional news vendor) and other web based documents processed between the current date and a past date. In one embodiment, the past date is the current date minus the time period the user has provided in a query. Documents (e.g. news events) associated with a time between the current date and the past date are determined to be of interest to the user and these are the documents from which corresponding predictions are derived. Such documents are "time-based" because they are associated with one or more times. Examples of times include, but are not limited to, those for generation of the document, transmission of the document, receipt of the document, publication of the document, an event described by the document, etc.

FIGS. 4A-C is an example method for generating a prediction of a future event according to one embodiment. In the illustrated embodiment, an example of the working of the Softbots responsible for making predictions is shown. At block 400, a data corpus for multiple entities (e.g. multiple business organizations) is obtained in the form of receiving online news and mined data from the World Wide Web (WWW). At block 402, on the received document, a Global Agent 304 performs data-entity pairing logic to determine which news or data is talking about which particular entity. In one embodiment, the data-entity pairing logic may be purely heuristic and rule based and its precision and recall may be well tested to a justified precision. Once data-entity pairing logic is performed, the respective data is passed to the corresponding Softbot responsible for a particular entity (e.g. an organization). In one embodiment, this is an ongoing and continuous process where data beyond a certain threshold is archived and the data-entity pairing logic works on fresh, online news or documents received on the Cloud.

At 404, a query including a time period is received from the user. In one embodiment, the time period is a time period of interest, e.g., a time period limiting the documents from which the prediction is to be made to documents with a timestamp within the time period. For example a typical query could be, "Is there a possibility of Leadership change in Yahoo if acquired by Microsoft based on the last month of news". The above query may be generated by a user 302 through a suitable interface. The Global Agent 304 processes the query and determines one or more relevant categories, which, still referring to the Microsoft and Yahoo example, may be business categories such as Leadership Change and Acquisition on which predictions are to be made and determines that Microsoft and Yahoo are the appropriate entities for which dedicated Softbots are to be activated. Hence, Softbots corresponding to Microsoft and Yahoo are activated. Softbots of Microsoft and Yahoos hare their respective last one month News/Docs (e.g. the data for the last one month distributed to these Softbots at block 402) using the Global Agent 304. It should be recognized that the description herein may occasionally refer to an example involving Microsoft and Yahoo for clarity and convenience and that other examples of entities, queries, predictions, etc. exist and are contemplated.

At 406, the Softbots for Microsoft and Yahoo start processing their respective Documents and classifying those Documents. In one embodiment, the documents are classified utilizing Latent Dirichlet Allocation technique of Machine Learning to model the News/Doc and classify the Documents into one or more relevant categories, which in present example, are Leadership Change and Acquisition. Latent Dirichlet Allocation uses a three tier Bayesian Hierarchical method to achieve topic modelling on the plurality of documents shared by the activated Softbots (i.e. Microsoft Softbot and Yahoo Softbot in the preceding example). FIG. 5A is a representative example of an application of step 406.

The method of FIG. 4A continues at block 408 of FIG. 4B. At 408 of FIG. 4B, the documents categorized as per the categories, at block 406, are further classified using vector extraction an example of which is shown in FIG. 5B where vector is representative of Entity-Category relationship. Let us take an example instance of the News as:

> Apple's hiring of Adobe's former CTO Kevin Lynch opens some intriguing possibilities for the Cupertino, Calif. company's future moves, analysts said today.

For the example news immediately above, possible Vectors representing Entity-Category Relationships include: <Apple hiring Kevin>, <Kevin CTO Adobe>. FIG. 5B illustrates similar Vectors representing Entity-Category Relationships extracted from the illustrated example News instances on Microsoft.

In some embodiments, news feeds are viewed as series of short text documents which are tokenized to classify these news feeds into a set of classes refer to categories. In some embodiments the tokenized short text documents (news feeds) along with appropriate occurrences are used. These occurrences may refer to things that may happen between two identified tokens. For example, the identified tokens may include, but are not limited to, Company, Executive and Position. In the above news feed example, possible token pairs to describe occurrences may include, but are not limited to, Company-Company (C-C); Company-Executive (C-E); Executive-Executive (E-E); Executive-Position (E-P).

Occurrences that can happen between two tokens need to be captured. These occurrences may be either hand crafted or obtained using topic modelling methods. For example, occurrences that may happen between two companies (Company-Company) may include but are not limited to: Company can buy a company; Company can do business with another company or sign a particular project with another company or can outsource a piece of work to another company, etc. Examples of occurrences that can happen between a company and an executive (Company-Executive) may include but are not limited to: Company promotes an executive; fires an executive; changes an executive from one role to another role; etc. It should be noted that the preceding are merely illustrative examples of occurrences and that many more occurrences are contemplated and within the scope of the disclosure herein.

Such occurrences within a document feed (e.g. news feed or stream of News) are captured and their frequencies are noted. In one embodiment, a document (e.g. news from a news feed) may, therefore, be represented as a vector where C, E, Po stands for Company, Executive and Position, respectively:

| C-C | | C-E | | E-E | | E-Po | |
|---|---|---|---|---|---|---|---|
| $e_{11}$ | ... $e_{1n}$ | $e_{11}$ | ... $e_{1n}$ | $e_{11}$ | ... $e_{1n}$ | $e_{11}$ | ... $e_{1n}$ |

Where e11 under the heading C-C represent the frequency of a particular C-C occurrence (Company A acquiring Company B) in a particular document.

This representation addresses the challenges of converting a lengthy News piece into meaningful entities and occurrences by identifying the occurrences pertaining to a pair of tokens (for example, what occurrences can potentially occur between Company-Company) and extracting a frequency of the identified occurrences between the two tokens in question (noting that C-C type occurrences can occur multiple times in a document and/or the news feed). Such conversion of News into entities and occurrences allow the News to decompose into useful feature set utilized for classification.

Once a document (e.g. news) is represented in the above vectorised form, the entire news feed collection for a particular entity may be represented in a matrix as illustrated below in matrix X: where each row is set of vectors representing Entity and Occurrence relationship into one of the relevant classes or categories.

$$X = \begin{matrix} e_{11} & ... & e_{1n} & e_{11} & ... & e_{1n} & e_{11} & ... & e_{1n} & e_{11} & ... & e_{1n} & LC & EXP & ACQ & LIT \\ e_{21} & ... & e_{2n} & e_{21} & ... & e_{2n} & e_{21} & ... & e_{2n} & e_{21} & ... & e_{2n} & OUTP & EXP & NewO & FUND \\ e_{31} & ... & e_{3n} & e_{31} & ... & e_{3n} & e_{31} & ... & e_{3n} & e_{31} & ... & e_{3n} & R\&D & NewO & OUTP & FUND \\ e_{41} & ... & e_{4n} & e_{41} & ... & e_{4n} & e_{41} & ... & e_{4n} & e_{41} & ... & e_{4n} & ACQ & PART & LIT & - \end{matrix}$$

Where each row of matrix X represents a news feed wherein the news feed is relevant news information extracted from the (news) data corpus received at block 400 and encoded in vector form as shown in Matrix X. Note that each row of the news feed is categorized in the training dataset according to the predefined set of class labels as which may correspond with the categories (e.g. business categories such as Acquisition (ACQ), Litigation (LIT), New Offering (NewO), Research and Development (R&D), Expansion (EXP), and so on). Note that in addition to the above elements of a particular row, term frequency-inverse document frequency (TF-IDF) features (which may also be known as Inverse Term Document Frequency) may be included.

In one of the embodiment, the matrix X representation also includes past, present and future information from the documents obtained by using natural language processing (NLP) tools to obtain tense information per sentence and using tense information along with the events extracted from the documents or news data corpus for the respective entity.

Figure 5D:
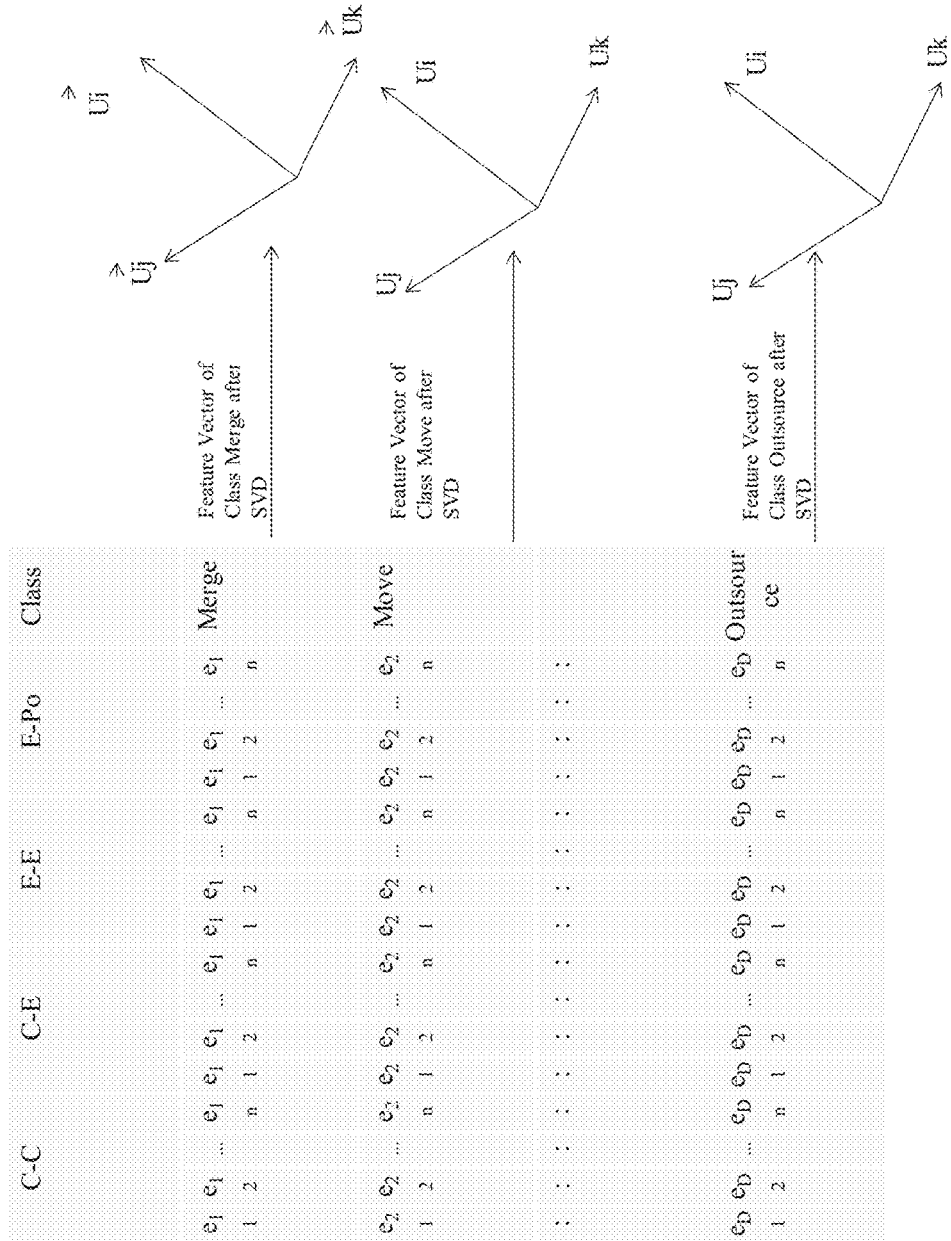

FIG. 5C is an example matrix representation obtained by respective Softbots for their respective entity. It should be recognized that the matrices shown in FIG. 5C are examples of instances of matrix X (described above in general terms) generated for specific entities. For example, FIG. 5C illustrates a matrix X instance generated for Microsoft, a matrix X instance generated for Yahoo, a matrix X instance generated for Oracle and a matrix X instance generated for Nokia according to one embodiment. This matrix is decomposed to lower dimension reduction using singular value decomposition (SVD) by each of the Softbots and top K feature vectors are obtained as shown in FIG. 5D. Softbots may perform this SVD decomposition using Gorell-Webb incremental SVD decomposition which is computable on a distributed environment (e.g. that of Hadoop). This distributed computation of the Matrix representation can be appreciated from knowing that each Softbot is processing their respective Matrices on the virtualized servers of the Cloud simultaneously and in a very short span of time each Softbot is prepared for the further processing thereby allowing the derivation of the predictions dependent on multiple classes and entities to be generated for the user within a short period of time despite the fact that the total data corpus seen by the invention in general is so huge. The disclosure herein applies reductionism to the data through Softbots while still maintaining the illusion of one joint global performance on the huge amount of data by utilizing distributed computation.

Likewise the feature vectors, e.g., those shown in in 5D, used for classification of various important classes (e.g. business categories) are obtained. For example, important classes may include business categories such as Leadership Changes, New Offerings, Acquisitions, Partnerships, Expanding Operations, Cost Cutting, Outperforming, Underperforming, Company Presentation, Litigation, Compliance, Research & Development, Data Security, Funding Developments, Bankruptcy & Restructuring, Real Estate, Construction Corporate, etc. To classify news/docs in each of these classes successfully, Softbots employing the feature vectors as shown in FIG. 5D obtained by SVD decomposition, construct a binary classifier for each of the relevant classes using the training data (e.g. the collection of Matrices illustrated in FIG. 5C for various business organizations). Assuming non-linearly separable classes (or business categories) and hence through Support Vector Machines, SVM, t classification is employed to derive the desired functional parameters using statistical learning through. In some embodiments, the desired functional parameters are continuously or periodically (depending on the embodiment) updated.

$$SV \text{ classification:} \min_{f,\xi_i} \|f\|_K^2 + C\sum_{i=1}^{l} \xi_i \quad y_i f(x_i) \geq 1 - \xi_i, \text{ for all } i$$

$\xi_i \geq 0$ where f( ) is a hyper plane function of SVM, x and y are the data points and. $\xi$ is an integer parameter to adjust the condition $y_i f(x_i) \geq 1 - \xi_I$ Thus, using above SV classification, each of the classes are learned to be classified as binary.

Softbots use Map and Reduce function such as those provided by Hadoop to apply distributed Machine Learning by performing batch gradient descent to optimize the objective function to obtain desired machine learning parameters in parallel. The mappers will calculate the partial gradient $\Sigma_{subgroup\ (i \in sv)}$ (w. $x_i$-yi)xi and the reducer will sum up the partial results to update w vector, for example, by applying the block diagram of FIG. 5E. Hence each of the new news test data is passed through these series of Classifiers and based on a certain threshold is determined to belong to one or more than one classes. The present invention is not restricted to Hadoop. Any suitable platform that eases Distributed Machine Learning can be utilized to learn the classification parameters spread across different classes through Distributed Map and Reduce Framework simultaneously. This eliminates the bottleneck of learning classifications about the classes spread across large volumes of data by allowing the learning parameters to be computed in a distributed way. If, in future, the volume of data increases exponentially, the net increase in effective computation time using the distributed machine learning described herein will not be large. Hence, the computational bounds involved in machine learning on BIG data has been eliminated and making useful predictions from trillions of units of data received monthly is enabled herein.

At 410 of FIG. 4B, Softbot prepares the interdependency Matrix of the associated classes important from the query point of view. For instance, if the user's query is regarding Leadership Change and Acquisition, Softbot determines the other important classes which can influence the data related with the Leadership change and Acquisition. For example, Leadership change may be influenced by the other business categories such as: Partnerships, Expanding Operations, Litigation, Corporate Challenges and similarly Acquisitions by: Outperforming, Underperforming, Litigation, Compliance, Bankruptcy & Restructuring. To summarize and simplify, each query can span predictions from more than one class (which may be a business category) and described herein is a suitable matrix data structure to capture such class interdependencies which is elaborated further below.

For each of the classes, Softbot may have pre stored relevant concepts influencing the class. For example, the below table for Leadership change represents the important/relevant concepts as columns and templates (e.g. token pairs such as Company-Company, Company-Executives, Executive-Executive, Executive-Role) as rows, where each of the cells of the interdependency Matrix holds the frequency count of the Document in which this Template-Concept (where each concept is an occurrence and referred to hereafter as Sub classes within their relevant category) association is found. In an alternative embodiment, the relevant concepts, which are sub classes of the particular class, can also be derived using Latent Dirichlet topic modelling applied for the original classes to label the (news) data corpus across all entities.

<Leadership Change Class Distilled to Sub Classes as Non-Overlapping Concepts>

|  | Hiring | Promotion | Resignations | Deceased Alerts | Retirements | Elections | Firing |
| --- | --- | --- | --- | --- | --- | --- | --- |
| C-C | 12 | — | — | — | — | — | — |
| C-E | 23 | 5 | 8 | — | 7 | 20 | 8 |
| E-E | 13 | 6 | 8 | — | 7 | 9 | 13 |
| E-R | 11 | 7 | 9 | — | 8 | 12 | 3 |

FIG. 6 is an example of step 412a, 412b, 412c, 412d of FIG. 4B which shows a Correspondence Analysis (CA) Matrix built by the Softbot for making predictions on the query shared by the User: "Is there any possible leadership change in Yahoo and Microsoft acquiring it"; this present query generated the Correspondence Matrix capturing the association relationship between the templates of the form Company-Company; Company-Executive; Executive-Position and similar with the Classes influencing simultaneously each other as Acquisitions, Leadership Change, Litigation, Corporate Challenges. The concepts within these classes are self-learned by the Softbots with manual assistance according to one embodiment. In one of the embodiment, respective Softbot construct the CA Matrix with columns for all the categories to capture all possible interdependencies or correlations across the categories influencing each other. In another embodiment, the columns of the CA Matrix are limited to those based on the categories derived from the query and the categories known to influence those categories derived from the query. By Manual assistance we mean here that if new concepts or sub classes are discovered in the future for any of the business categories then relevant synonyms (or POS or other language dependencies) of the concept are obtained for the classification function to learn the new concept. For any new class realized by the Softbot, a Softbot queries the Global Agent 304 for the associated concepts and the Global Agent 304 with the manual assistance of the administrator, generates the concepts for the new class and shares the new class with the appropriate Softbots. 600 is an example CA Matrix with each cell's 'x' represents the number of documents containing the required template-concept relationship. Along with the CA Matrix 600, a Softbot also maintains a series of hash tables 608 for the corresponding CA Matrix cell 602 as illustrated by layered hash table 608 in FIG. 6 for the cell 602. The hash table 608 for the corresponding cell 602 holds the information e.g. that of 604 with respective Executive Names and corresponding document identifiers from where the template-concept relationship is fetched, etc.

FIG. 7 illustrates an example bi-plot obtained by decomposing Matrix 600 using SVD, for example, using the Hadoop platform. In one embodiment, a Softbot generates individual bi-plots for each of the templates with the concepts associated with the respective template in the CA Matrix. For example, FIG. 7 shows the bi-plot generated for the C-E template, but it should be recognized that bi-plots may be generated for C-C, E-E, C-P, E-R, etc. In one embodiment, time information is maintained in the Correspondence Analysis Matrix 600 (e.g. see "Future" in 604) and hence the vectors obtained in the bi-plot are encoding resulting time information. The bi-plot derived from the distributed processing of the Matrix of FIG. 6 beneficially allows the User to appreciate that the present Utility is predicting a possible future event on one or more relevant classes (e.g. business categories). With existing solutions, the User is kept oblivious as to why a prediction has been generated, why a prediction is relevant to the query and the query may be made with no active participation from the User. The bi-plots obtained by CA Matrix decomposition on the other hand are strong visualization mediums to allow the user to appreciate a prediction made on the relevant categories. Also the bi-plots are generated for each of the relevant (i.e. inter influencing) business categories (e.g. as shown in FIG. 7); hence if user wishes to know the prediction about a class different from the previous query, a Softbot can still use the same Bi-Plot to make the relevant predictions in real time. For example, assume a user queries on Leadership Change, and assume that Acquisition and New Offering are inter influencing categories; in one embodiment, the Bi-Plot generated for any one the categories as per the query (e.g. Leadership Change) can also be utilized for the next query asking about one of the inter influencing categories on the same organization (e.g. Acquisition and/or New Offering. A strength of using CA Matrix decomposition is the capture and preservation of interdependencies or correlation among the different categories and its usefulness in answering various queries on these interdependent categories using the same, previously generated bi-plot.

FIG. 8 and FIG. 9 are associated with step 414 of the flowchart of FIG. 4C, which is a continuation of the method of FIGS. 4A-B. FIGS. 8 and 9 illustrate generating the declarative prediction after the bi-plot is generated by the Softbot according to one embodiment. As shown in FIG. 8, as an example, there are three template-concept relationships obtained (as illustrated for FIGS. 6 and 7) from the bi-plot (specific to example shown in the FIG. 8) which has potential of making future predictions in response to a query; Microsoft-C-Hiring-Present, 802; Yahoo-E-Role-Past 804, and Microsoft-C-Moves-Future 806. 802 is from Leadership change as Hiring is a subclass of Leadership change as shown in 600. 806 is from Acquisitions as Moves is a subclass of Acquisition as shown in 600. 804 is common for both Microsoft and Yahoo Softbots. Assume, for example, User is interested to know the acquisition prediction if there is a leadership change in Yahoo which News 800 is stating as possibility of future move. The Microsoft Softbot, before making a prediction, communicates with the Yahoo Softbot using well-formed predicate logic formula as message passing on template-concept relationship as shown in FIG. 9, where Softbot 900 enquires to Softbot 902 about the truth of: $\exists X$: (Yahoo, E-R, past); i.e., if there exist a X, in Yahoo which is an Executive working in some role in past. Softbot 902 consults the Leadership submatrix 904 of the Correspondence Analysis Matrix (e.g. 600 of FIG. 6) and, using a hash table (e.g. 608 of FIG. 6), arrives at the information as in 602 to access the News 908. Using String matching, Softbot determines the truth of the formula and instantiate the formula and send back to Softbot 900.

Referring again to FIG. 8, a Microsoft Softbot 900 on receiving the formula as query answer, develop the prediction as:

Microsoft acquisition (Move is a sub class of acquisition category) of Yahoo is possible as found Microsoft hired Kevin Lynch of Yahoo and as confirmed by Yahoo.

Bi-Plot of Microsoft-Yahoo acquisition is derived similar to the C-E Bi-Plot in FIG. 7, but for C-C and may have different vectors.

Similar to the C-E Bi-plot in FIG. 7 demonstrating step 416 and 418 of FIG. 4C, a Bi-plot of C-C (Microsoft-Yahoo) derived from the Correspondence Matrix analysis 600 is plotted and instantiated to present before the User to allow the user to understand why the Softbot 900 is predicting the possible Acquisition due to leadership change. This visualization of the possible predictions with respect to the template and concepts of the particular classes may be beneficial to understanding why a given prediction was made. The prediction may be obtained by employing vector calculus. For example, vector calculus to determine the angle between the two vectors, their relative lengths, whether the two vectors are parallel or not, etc. Also inertia which is a property of CA Analysis can be calculated to determine if rows and columns of the CA Matrix are strongly correlated or not. Such back ground bi-plot manipulation allows determination of which template and concept are strongly correlated and hence eligible for prediction as future event.

An alternative embodiment for generating a prediction is discussed with reference to FIG. 10 and FIG. 11. FIG. 11 is the general flowchart of an alternate embodiment. At 1100, User herself generates the class of interest for which she is interested in knowing the prediction based on last 'X', days news for a particular entity which is a time based query and the generated class is the classification criterion. Let us assume the User queries "is there a future possibility of an Executive, by the name 'Y', to exit from Microsoft in coming X days." On receiving this time-based query asking prediction based on next X days and "Exit" is a concept or sub class to one of the classification criterion, let us assume, as an example, the leadership class is the classification criterion as illustrated in 1004, and entities Company or Executive forming a template as C-E, shown as one of the rows in the Matrix 1004; wherein if the entity of interest is Microsoft, the Softbot determines that the relationship criterion is between the influential entities Company, Executive and the influential concept 'exit'. Hence concept, "exit", is a real time event combining the association between entities Organization (Microsoft as in the query example) and the Executive 'Y', with the relationship "exit".

Based on the above time-based query, in one embodiment, a Softbot at 1102, consults a knowledge base (e.g. a SQL based DBMS) that stores knowledge (i.e. data) about various classification criterions and their inter influences, their influential entities and influential concepts. For example, the knowledge base may include influential entities as business entities such as Companies, Executives, Executives titles, Company Product, Company Revenue, which Executives belong to which Companies, and so forth, along with the influential concepts such as Hiring, Promotion, Resignation and so forth for the class criterion "Leadership."

Figure 10:
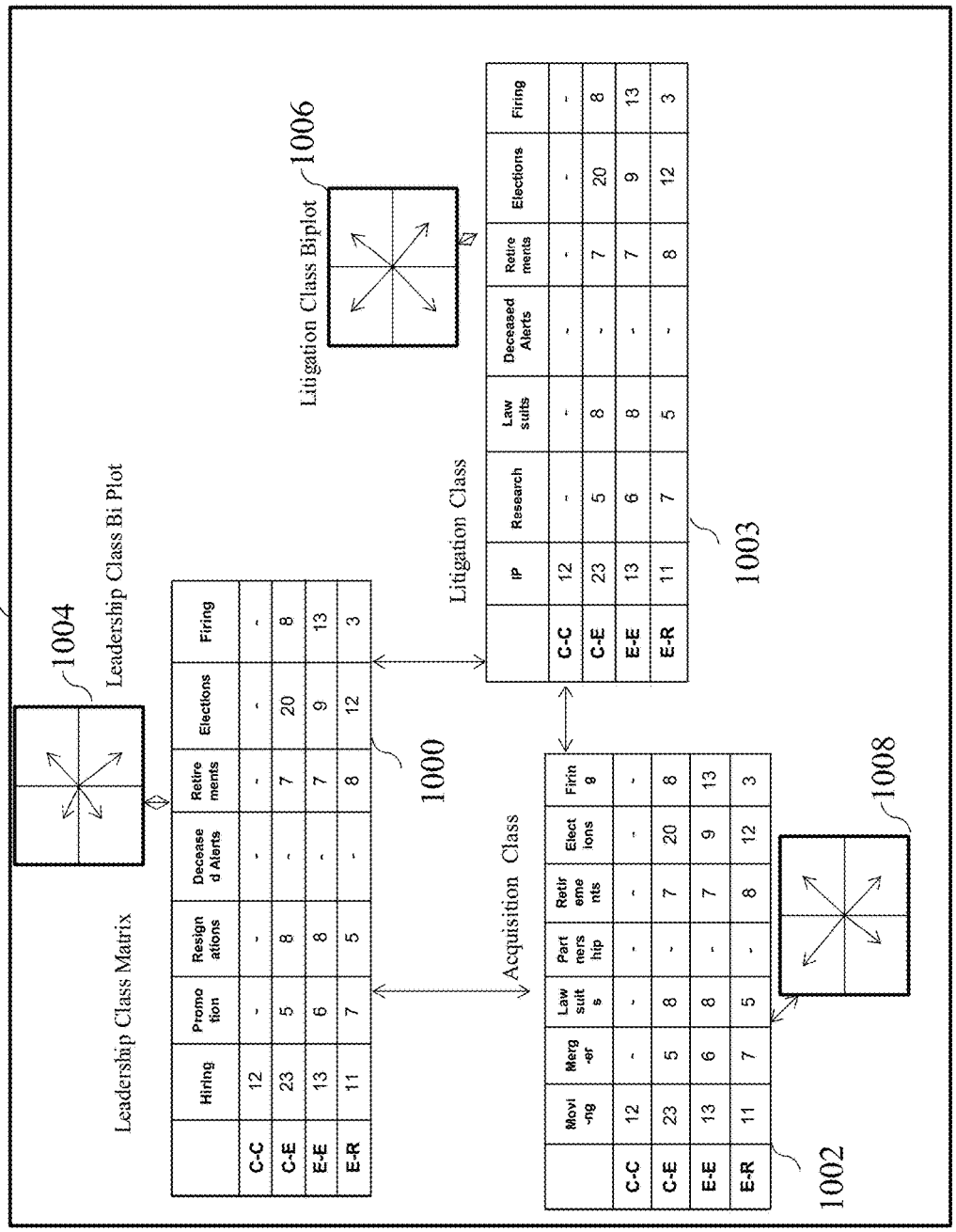
FIG. 10 includes example sketches of a network of classes generating predictions through Bi-Plots in real time according to one embodiment.
Figure 11A:
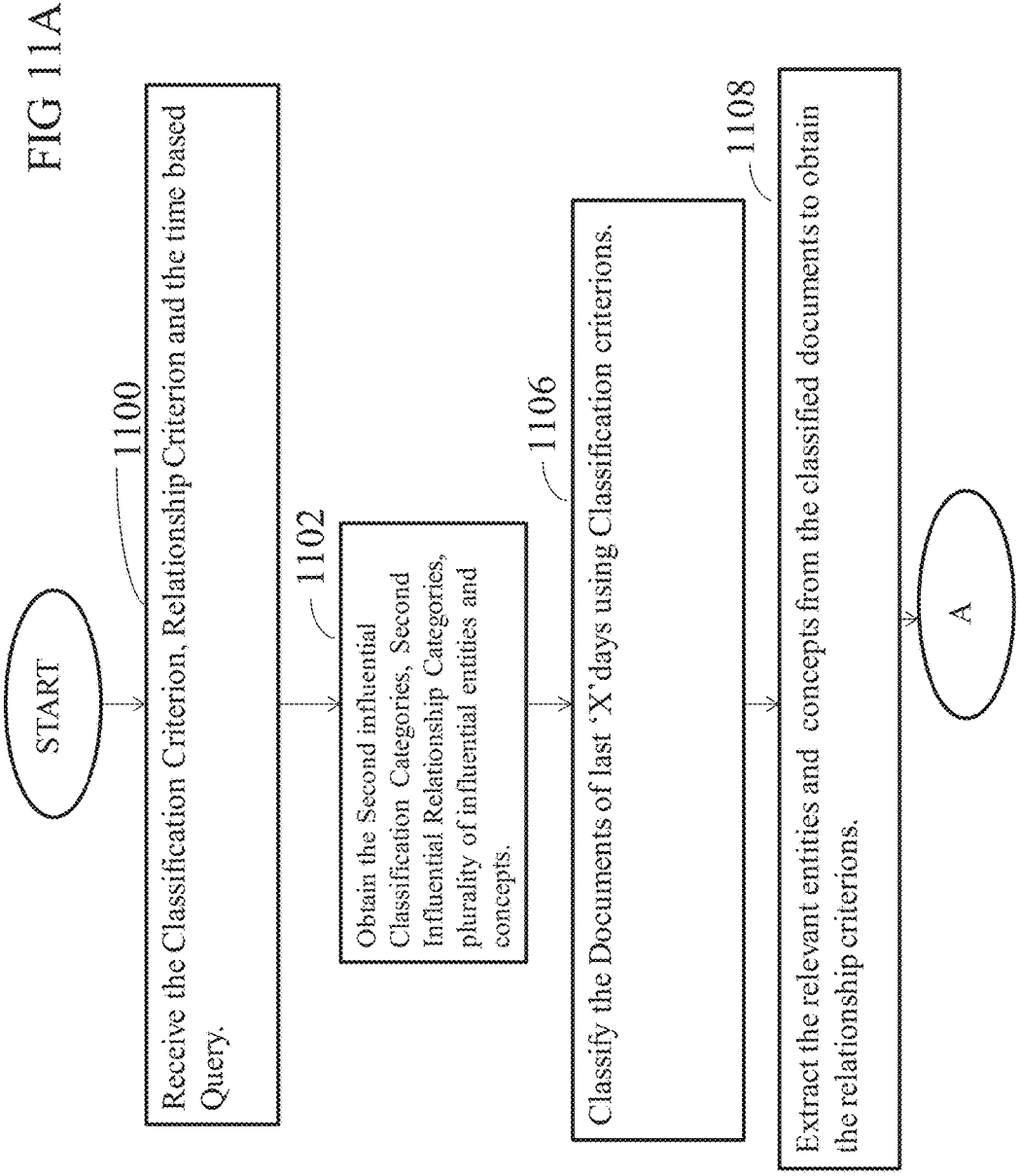

In FIG. 10, for example, the classification criterion Leadership is determined for the concept "Exit", mentioned in the query from the knowledge base and hence for next X days, News is classified into Leadership Change by using SVM binary classifiers as illustrated in 5C and 5D, relationship criterions as real world associations between entities as rows and influential concepts as columns marked by the frequency of the associations shown for the Leadership class matrix 1000. Secondary or "Second" influential classification criterions for Leadership are obtained, which in the present example are shown as Acquisitions and Litigation. The influential concepts Moving, Merger, Law suits as shown in columns of 1002 for Acquisition Class and IP, Research, Law suits and similar as influential concepts shown in the columns of 1003 for the second influential classification class named Litigation are also obtained from the knowledge base. Second influential relationship criterions are relationships between influential entities, such as Company, Executives, Roles, Product, Revenue expressed as templates C-C(Company-Company), C-E (Company-Executive) as Rows of the Matrices, and concepts, e.g. those shown in columns of Matrices 1000, 1002, 1003, obtained from the knowledge base according to one embodiment.

Hence the present embodiment, at 1106, first classifies the available documents for the time-period of interest (e.g. News, Web News, Blogs and similar online documents) based on one or more classification criterions (e.g. Leadership in the present example) and one or more second influential classification criterions (e.g. Acquisitions and Litigation in the present example) using binary SVM Classifiers as described in 5E, using Map and Reduce functions such as those of Hadoop to facilitate distributed Machine Learning on the cloud.

Once the documents for the time period of interest are classified, influential entities are extracted from the classified documents at 1108 along with the influential concepts using Natural Language Processing tools. At 1110, Data Representations in the form of Matrix capturing Entities—Concept as Relationship Criterions of the entities shown as rows with the corresponding Classification criterion concepts as columns shown in example Matrices 1000, 1002 and 1003. Frequencies of such Relationship criterion between entities and concepts fetched from the Documents are populated with numerical values in the cells of the Matrices. At 1112, the Matrices for the classification criterion, and one or more second influential classification criterion matrices 1000, 1002 and 1003 in the example of FIG. 10) are decomposed using SVD (which was described above with reference to FIGS. 5D and 5E) on different servers, the corresponding bi-plots 1004, 1006 and 1008 are generated to derived meaningful predictions capturing the joint influence of corresponding classification and relationship criterions by imposing one Bi-Plot (e.g. 1004 of Leadership Class) over another (e.g. 1006 of Acquisition Class) to mathematically generate the combined influence by superimposing the vectors of these bi-plots (as done in regular vector calculus) and calculating the combined influence within the prediction. For example, if there is News on Leadership Class on Microsoft as that Executive 'Y', may resign and there is News in Acquisition Class as Google is acquiring Microsoft, the net prediction including the combined influence will be Google acquiring Microsoft by determining the corresponding Bi-Plots vectors similarity of Leadership and Acquisition class and therefore deriving the prediction, Executive 'Y', of Microsoft may exit which is a real world influence generated from the combined influences of leadership change and acquisition. Hence Bi-Plots serve to generate such real world influences between the entities and concepts involved in the classification criterion by modelling the combined influence between the entities and concepts as correlations between the rows and the columns of the suggested matrices.

This alternate embodiment may beneficially make predictions incorporating joint influences of the entities and relationships existing between them and provide a visualization display of results, which are not provided by exiting solutions.

Figure 12:
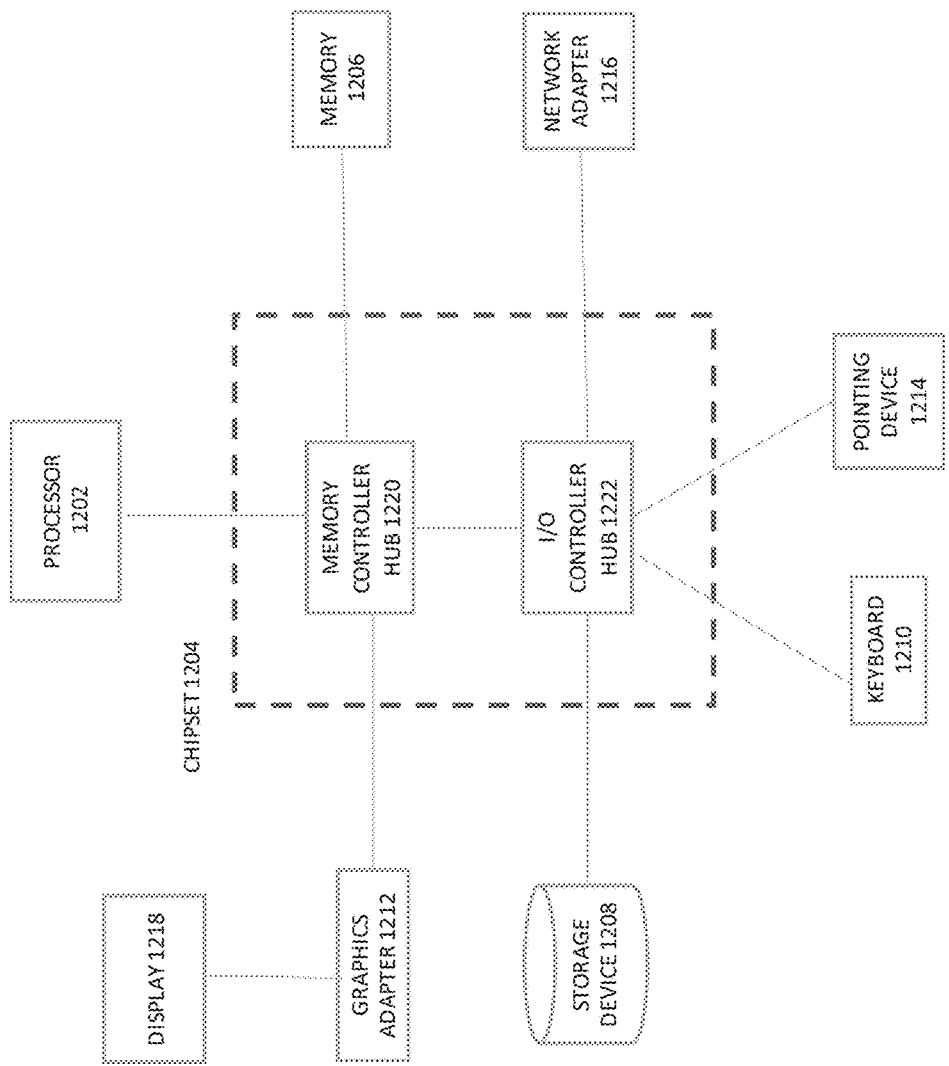
FIG. 12 is a high-level block diagram illustrating physical components of a computer used by one or more of the entities illustrated in the above figures according to one embodiment.

FIG. 1200 is a high-level block diagram illustrating example, physical components of a computer 1200 used by one or more of the entities illustrated in herein according to one embodiment. It should be recognized that FIG. 12 is merely an example and a computer used to perform the functionality descried herein may include other or different components and may omit components. Illustrated in FIG. 12 are at least one processor 1202 coupled to a chipset 1204. Also coupled to the chipset 1204 are a memory 1206, a storage device 1208, a keyboard 1210, a graphics adapter 1212, a pointing device 1214, and a network adapter 1216. A display 1218 is coupled to the graphics adapter 1212. In one embodiment, the functionality of the chipset 1204 is provided by a memory controller hub 1220 and an I/O controller hub 1222. In another embodiment, the memory 1206 is coupled directly to the processor 1202 instead of the chipset 1204.

The storage device 1208 is any non-transitory computer-readable storage medium, such as a hard drive, compact disk read-only memory (CD-ROM), DVD, or a solid-state memory device. The memory 1206 holds instructions and data used by the processor 1202. The pointing device 1214 may be a mouse, track ball, or other type of pointing device, and is used in combination with the keyboard 1210 to input data into the computer 1200. The graphics adapter 1212 displays images and other information on the display 1218. The network adapter 1216 couples the computer system 1200 to a local or wide area network.

As is known in the art, a computer 1200 can have different and/or other components than those shown in FIG. 12. In addition, the computer 1200 can lack certain illustrated components. In one embodiment, a computer 1200 acting as a server may lack a keyboard 1210, pointing device 1214, graphics adapter 1212, and/or display 1218. Moreover, the storage device 1208 can be local and/or remote from the computer 1200 (such as embodied within a storage area network (SAN)).

As is known in the art, the computer 1200 is adapted to execute computer program modules for providing functionality described herein. As used herein, the term "module" refers to computer program logic utilized to provide the specified functionality. Thus, a module can be implemented in hardware, firmware, software or a combination thereof. In one embodiment, program modules are stored on the storage device 1208, loaded into the memory 1206, and executed by the processor 1202.

In some embodiments, one or more of the components discussed above may each include one or more modules. For example, a global agent may include one or more modules that provide the functionality described above with regard to the global agent. Similarly, a Softbot may comprise one or more modules that provide the functionality described above with reference the one or more Softbots.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect may not be mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Also, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What has been described above includes examples of the disclosed innovation. It is, of course, not possible to describe every conceivable combination of components and/or methodologies contemplated, but one of ordinary skill in the art may recognize that many further combinations and permutations are possible. Accordingly, the innovation is intended to embrace all such alterations, modifications and variations that fall within the spirit and scope of the appended claims and the disclosure herein.

Furthermore, to the extent that the term "includes" or "present" is used in either the detailed description or the claims, such term is intended to be inclusive in a manner similar to the term "comprising" as "comprising" is interpreted when employed as a transitional word in a claim.

We claim:

1. A method comprising:
receiving, using one or more processors, a plurality of time-based documents;
receiving, by a Software as a Service cloud-based server, a user query including a time period of interest defining a subset of the plurality of time-based documents from which to generate a prediction;
determining to activate a plurality of cloud-based software agents, which execute on a plurality of remote computational devices geographically distributed across world geography, based on a plurality of entities associated with the user query, wherein each of the plurality of cloud-based software agents is dedicated to a single entity within the plurality of entities associated with the user query;
classifying, by executing the plurality of cloud-based software agents on the plurality of remote computational devices, the subset of the plurality of time-based documents into a plurality of classes for the plurality of entities, wherein the plurality of cloud-based software agents intercommunicate using distributed processing; and
generating, by executing the plurality of cloud-based software agents on the plurality of remote computational devices, using at least one machine learning method, the prediction based on the subset of the plurality of time-based documents for at least one of a plurality of categories.

2. The method as claimed in claim 1, wherein the plurality of cloud-based software agents include one or more of an intelligent software agent, an automated software agent, and an intelligent automated software agent.

3. The method as claimed in claim 1, wherein a first cloud-based software agent of the plurality of cloud-based software agents continuously updates its corresponding plurality of machine learning parameters.

4. The method as claimed in claim 3, wherein the plurality of machine learning parameters include functional parameters derived from a statistical learning on a plurality of features extracted from the subset of the plurality of time-based documents using the at least one machine learning method.

5. The method as claimed in claim 4, wherein the functional parameters are derived using Support Vector Machine classification as the at least one machine learning method.

6. The method as claimed in claim 1, wherein the plurality of time-based documents comprise one or more of news stories, news blogs, and web documents about the plurality of entities.

7. The method as claimed in claim 1, wherein the plurality of time-based documents are received from one or more of a plurality of news vendors and by mining a relevant plurality of hyperlink texts available on a world wide web, and wherein the user query includes a time period and the subset of the plurality of time-based documents is determined as those time-based documents associated with a time between a current time and a past time, the past time being calculated by subtracting the time period from the current time.

8. The method as claimed in claim 1, wherein the plurality of entities comprise at least one of: a business organization, an individual, a community, and a group.

9. The method as claimed in claim 1, wherein the plurality of time-based documents are classified using at least one of a natural language processing method and a machine learning method.

10. The method as claimed in claim 1, wherein the plurality of categories include at least one of: a leadership change, a recent acquisition, a recent merger, and an intellectual property portfolio.

11. The method as claimed in claim 1, wherein the plurality of cloud-based software agents communicate with one another using a message passing in a form of predicate logic.

12. The method of claim 1, wherein the time period of interest establishes a time period from a current date to a past date, wherein a time-based document is associated with a time, the time associated with one or more of generation of the time-based document, transmission of the time-based document, receipt of the time-based document, publication of the time-based document, and an event described by the time-based document.

13. A method comprising:
receiving, using one or more processors, a time-based query from a user;
determining a classification criterion, a relationship criterion, and a time period of interest from the time-based query;
obtaining at least one second classification criterion, at least one second relationship criterion, a plurality of concepts, and a plurality of entities from a knowledge base;
classifying a plurality of documents based on the classification criterion, the at least one second classification criterion, and the time-based query using a distributed machine learning method;
extracting the plurality of entities for the relationship criterion, the at least one second relationship criterion from a plurality of classified documents based on the classification criterion, the at least one second classification criterion, and the time-based query using a distributed processing;
generating a plurality of data representations between the relationship criterion and said plurality of entities based on said classification criterion and the time-based query using the plurality of classified documents; and
applying a distributed processing method to manipulate said plurality of data representations for generating a visualization of a prediction responsive to the time-based query, wherein the prediction captures a combined influence existing between the classification criterion, the at least one second classification criterion, the relationship criterion, and the at least one second relationship criterion.

14. The method as claimed in claim 13, wherein one or more of the classification criterion and the at least one second classification criterion include at least one of: a leadership change, a recent acquisition, a recent merger, and an intellectual property portfolio.

15. The method as claimed in claim 13, wherein the time-based query is a query involving the plurality of entities mentioned in the plurality of documents during the time period of interest.

16. The method as claimed in claim 13, wherein the classifying of the plurality of documents uses at least one machine learning method.

17. The method as claimed in claim 13, wherein the relationship criterion and the at least one second relationship criterion include a relationship among the plurality of entities, wherein the relationship is an association between said entities and said criterion.

18. The method as claimed in claim 13, wherein the extracting the plurality of entities utilizing the relationship criterion use at least one natural language processing method and said plurality of entities include one or more of an organization, an executive, an organization's product, an organization's revenue, an organization's share, and an executive's role.

19. The method as claimed in claim 13, wherein the plurality of influential entities comprise at least one of: an organization, a group, a community, and an individual.

20. The method as claimed in claim 13, wherein the plurality of concepts include real time events associated with said relationship criterions and said classification criterion.

21. The method as claimed in claim 13, wherein the distributed processing comprises a map-reduce framework of Hadoop.

22. The method as claimed in claim 13, wherein the visualization comprises one or more of a text and a graph.

23. The method as claimed in claim 13, wherein the combined influence is an influence existing between said entities, said concepts, and said classification criterions.

24. A system comprising;
a processing device implementing a Software as a Service cloud-based server for receiving a user query including a time period of interest defining a subset of a plurality of received time-based documents from which to generate a prediction; and
a plurality of remote computational devices geographically distributed across world geography, the plurality of remote computational devices implementing a plurality of cloud-based software agents activated based on a plurality of entities associated with the user query, wherein each of the plurality of cloud-based software agents is dedicated to a single entity within the plurality of entities associated with the user query, the plurality of cloud-based software agents for classifying the subset of the plurality of time-based documents into a plurality of classes for the plurality of entities, wherein the plurality of cloud-based software agents intercommunicate using distributed processing, the plurality of cloud-based software agents generating, using at least one machine learning method, the prediction based on the subset of the plurality of time-based documents for at least one of a plurality of categories.

25. The system of claim 24, wherein the plurality of cloud-based software agents include one or more of an intelligent software agent, an automated software agent, and an intelligent automated software agent.

26. The system of claim 24, wherein a first cloud-based software agent of the plurality of cloud-based software agents continuously updates its corresponding plurality of machine learning parameters.

27. The system of claim 26, wherein the plurality of machine learning parameters include functional parameters derived from a statistical learning on a plurality of features extracted from the subset of the plurality of time-based documents using the at least one machine learning method.

28. The system of claim 27, wherein the functional parameters are derived using Support Vector Machine classification as the at least one machine learning method.

29. The system of claim 24, wherein the plurality of time-based documents comprise one or more of news stories, news blogs, and web documents about the plurality of entities.

30. The system of claim 24, wherein the plurality of time-based documents are received from one or more of a plurality of news vendors and by mining a relevant plurality of hyperlink texts available on a world wide web, and wherein the user query includes a time period and the subset of the plurality of time-based documents is determined as those time-based documents associated with a time between a current time and a past time, the past time being calculated by subtracting the time period from the current time.

31. The system of claim 24, wherein the plurality of entities comprise at least one of: a business organization, an individual, a community, and a group.

32. The system of claim 24, wherein the plurality of time-based documents are classified using at least one of a natural language processing method and a machine learning method.

33. The system of claim 24, wherein the plurality of categories include at least one of: a leadership change, a recent acquisition, a recent merger, and an intellectual property portfolio.

34. The system of claim 24, wherein the plurality of cloud-based software agents communicate with one another using a message passing in a form of predicate logic.

35. The system of claim 24, wherein the time period of interest establishes a time period from a current date to a past date, wherein a time-based document is associated with a time, the time associated with one or more of generation of the time-based document, transmission of the time-based document, receipt of the time-based document, publication of the time-based document, and an event described by the time-based document.

36. A system comprising;
a memory; and
a processor operatively coupled to the memory, the processor configured to perform the steps of:
receiving a time-based query from a user;
determining a classification criterion, a relationship criterion, and a time period of interest from the time-based query;
obtaining at least one second classification criterion, at least one second relationship criterion, a plurality of concepts and a plurality of entities from a knowledge base;
classifying a plurality of documents based on the classification criterion, the at least one second classification criterion, and the time-based query using a distributed machine learning method;
extracting the plurality of entities for the relationship criterion, the at least one second relationship criterion from a plurality of classified documents based on the classification criterion, the at least one second classification criterion, and the time-based query using a distributed processing;
generating a plurality of data representations between the relationship criterion and said plurality of entities based on said classification criterion and the time-based query using the plurality of classified documents; and
applying a distributed processing method to manipulate said plurality of data representations for generating a visualization of a prediction responsive to the time-based query, wherein the prediction captures a combined influence existing between the classification criterion, the at least one second classification criterion, the relationship criterion, and the at least one second relationship criterion.

37. The system of claim 36, wherein one or more of the classification criterion and the at least one second classification criterion include at least one of: a leadership change, a recent acquisition, a recent merger, and an intellectual property portfolio.

38. The system of claim 36, wherein the time-based query is a query involving the plurality of entities mentioned in the plurality of documents during the time period of interest.

39. The system of claim 36, wherein the classifying of the plurality of documents uses at least one machine learning method.

40. The system of claim 36, wherein the relationship criterion and the at least one second relationship criterion include a relationship among the plurality of entities, wherein the relationship is an association between said entities and said criterion.

41. The system of claim 36, wherein the extracting the plurality of entities utilizing the relationship criterion use at least one natural language processing method and said plurality of entities include one or more of an organization, an executive, an organization's product, an organization's revenue, an organization's share, and an executive's role.

42. The system of claim 36, wherein the plurality of entities comprise at least one of: an organization, a group, a community, and an individual.

43. The system of claim 36, wherein the plurality of concepts include real time events associated with said relationship criterions and said classification criterion.

44. The system of claim 36, wherein the distributed processing comprises a map-reduce framework of Hadoop.

45. The system of claim 36, wherein the visualization comprises one or more of a text and a graph.

46. The system of claim 36, wherein the combined influence is an influence existing between said entities, said concepts, and said classification criterions.

47. A non-transitory computer-readable medium storing instructions that, when executed by one or more processors, performs steps comprising:
receiving a plurality of time-based documents;
receiving a user query including a time period of interest defining a subset of the plurality of time-based documents from which to generate a prediction;
determining to activate a plurality of cloud-based software agents, which execute on a plurality of remote computational devices geographically distributed across world geography, based on a plurality of entities associated with the user query, wherein each of the plurality of cloud-based software agents is dedicated to a single entity within the plurality of entities associated with the user query;
classifying, by executing the plurality of cloud-based software agents, the subset of the plurality of time-based documents into a plurality of classes for the plurality of entities, wherein the plurality of cloud-based software agents intercommunicate using distributed processing; and
generating, by executing the plurality of cloud-based software agents on the plurality of remote computational devices, using at least one machine learning method, the prediction based on the subset of the plurality of time-based documents for at least one of a plurality of categories.

48. The computer-readable medium of claim 47, wherein the plurality of cloud-based software agents include one or more of an intelligent software agent, an automated software agent and an intelligent automated software agent.

49. The computer-readable medium of claim 47, wherein a first cloud-based software agent of the plurality of cloud-based software agents continuously updates its corresponding plurality of machine learning parameters.

50. The computer-readable medium of claim 49, wherein said plurality of machine learning parameters include functional parameters derived from a statistical learning on a plurality of features extracted from the subset of the plurality of time-based documents using the at least one machine learning method.

51. The computer-readable medium of claim 50, wherein the functional parameters are derived using Support Vector Machine classification as the at least one machine learning method.

52. The computer-readable medium of claim 47, wherein the plurality of time-based documents comprise one or more of news stories, news blogs, and web documents about the plurality of entities.

53. The computer-readable medium of claim 47, wherein the plurality of time-based documents are received from one or more of a plurality of news vendors and by mining a relevant plurality of hyperlink texts available on a world wide web, and wherein the user query includes a time period and the subset of the plurality of time-based documents is determined as those time-based documents associated with a time between a current time and a past time, the past time being calculated by subtracting the time period from the current time.

54. The computer-readable medium of claim 47, wherein the plurality of entities comprise at least one of: a business organization, an individual, a community, and a group.

55. The computer-readable medium of claim 47, wherein the plurality of time-based documents are classified using at least one of a natural language processing method and a machine learning method.

56. The computer-readable medium of claim 47, wherein the plurality of categories include at least one of: a leadership change, a recent acquisition, a recent merger, and an intellectual property portfolio.

57. The computer-readable medium of claim 47, wherein the plurality of cloud-based software agents communicate with one another using a message passing in a form of predicate logic.

58. The computer-readable medium of claim 47, wherein the time period of interest establishes a time period from a current date to a past date, wherein a time-based document is associated with a time, the time associated with one or more of generation of the time-based document, transmission of the time-based document, receipt of the time-based document, publication of the time-based document and an event described by the time-based document.

59. A non-transitory computer-readable medium storing instructions that, when executed by one or more processors, performs steps comprising:
receiving a time-based query from a user;
determining a classification criterion, a relationship criterion, and a time period of interest from the time-based query;
obtaining at least one second classification criterion, at least one second relationship criterion, a plurality of concepts, and a plurality of entities from a knowledge base;
classifying a plurality of documents based on the classification criterion, the at least one second classification criterion, and the time-based query using a distributed machine learning method;
extracting the plurality of entities for the relationship criterion, the at least one second relationship criterion from a plurality of classified documents based on the classification criterion, the at least one second classification criterion, and the time-based query using a distributed processing;
generating a plurality of data representations between the relationship criterion and said plurality of entities based on said classification criterion and the time-based query using the plurality of classified documents; and
applying a distributed processing method to manipulate said plurality of data representations for generating a visualization of a prediction responsive to the time-based query, wherein the prediction captures a combined influence existing between the classification criterion, the at least one second classification criterion, the relationship criterion, and the at least one second relationship criterion.

60. The computer-readable medium of claim 59, wherein one or more of the classification criterion and the at least one second classification criterion include at least one of: a leadership change, a recent acquisition, a recent merger, and an intellectual property portfolio.

61. The computer-readable medium of claim 59, wherein the time-based query is a query involving the plurality of entities mentioned in the plurality of documents during the time period of interest.

62. The computer-readable medium of claim 59, wherein the classifying of the plurality of documents uses at least one machine learning method.

63. The computer-readable medium of claim 59, wherein the relationship criterion and the at least one second relationship criterion include a relationship among the plurality of entities, wherein the relationship is an association between said entities and said criterion.

64. The computer-readable medium of claim 59, wherein the extracting the plurality of entities utilizing the relationship criterion use at least one natural language processing method and said plurality of entities include one or more of an organization, an executive, an organization's product, an organization's revenue, an organization's share, and an executive's role.

65. The computer-readable medium of claim 59, wherein the plurality of entities comprise at least one of: an organization, a group, a community, and an individual.

66. The computer-readable medium of claim 59, wherein the plurality of concepts include real time events associated with said relationship criterions and said classification criterion.

67. The computer-readable medium of claim 59, wherein the distributed processing comprises a map-reduce framework of Hadoop.

68. The computer-readable medium of claim 59, wherein the visualization comprises one or more of a text and a graph.

69. The computer-readable medium of claim 59, wherein the combined influence is an influence existing between said entities, said concepts, and said classification criterions.

* * * * *